United States Patent
Oh et al.

(10) Patent No.: US 10,916,226 B2
(45) Date of Patent: *Feb. 9, 2021

(54) DISPLAY DEVICE

(71) Applicant: LG ELECTRONICS INC., Seoul (KR)

(72) Inventors: Hawjun Oh, Seoul (KR); Hyungnam Lee, Seoul (KR); Taejun Kim, Seoul (KR); Hyein Jung, Seoul (KR); Kunsik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,229

(22) Filed: Oct. 23, 2019

(65) Prior Publication Data

US 2020/0058272 A1 Feb. 20, 2020

Related U.S. Application Data

(63) Continuation of application No. 16/011,029, filed on Jun. 18, 2018, now Pat. No. 10,490,169, which is a
(Continued)

(30) Foreign Application Priority Data

Oct. 13, 2015 (KR) ......................... 10-2015-0142999

(51) Int. Cl.
*G09G 5/391* (2006.01)
*G06F 1/16* (2006.01)
*G06F 3/14* (2006.01)
*G06F 3/0482* (2013.01)
*G09G 5/00* (2006.01)
(Continued)

(52) U.S. Cl.
CPC ........... *G09G 5/391* (2013.01); *G06F 1/1601* (2013.01); *G06F 1/1626* (2013.01); *G06F 1/1652* (2013.01); *G06F 3/0482* (2013.01); *G06F 3/14* (2013.01); *G09G 5/006* (2013.01); *G09G 5/14* (2013.01); *G09G 2340/0407* (2013.01); *G09G 2340/0442* (2013.01); *G09G 2354/00* (2013.01); *G09G 2370/022* (2013.01);
(Continued)

(58) Field of Classification Search
CPC ........ G06F 1/1652; G06F 2203/04102; H04M 1/0268; G09F 9/301; G09G 2380/02
See application file for complete search history.

(56) References Cited

U.S. PATENT DOCUMENTS 9,098,241 B1    8/2015  Cho et al.
2002/0070910 A1*  6/2002  Fujieda ................... G09F 9/301
                                          345/85

(Continued)

FOREIGN PATENT DOCUMENTS

WO   WO 2014/200151 A1   12/2014

*Primary Examiner* — Koosha Sharifi-Tafreshi
(74) *Attorney, Agent, or Firm* — Birch, Stewart, Kolasch & Birch, LLP

(57) ABSTRACT

A display device includes a body; a roller rotatably installed in the body; a flexible display configured to be wound or unwound from the roller in response to a rotation of the roller; and a controller configured to detect a type of a content to be displayed, and change a screen size of the flexible display according to the detected type of the content by winding or unwinding of the flexible display.

18 Claims, 14 Drawing Sheets

Related U.S. Application Data continuation of application No. 15/225,993, filed on Aug. 2, 2016, now Pat. No. 10,013,955.

(51) Int. Cl.
  *G09G 5/14* (2006.01)
  *H04N 21/488* (2011.01)
  *H04N 21/81* (2011.01)

(52) U.S. Cl.
  CPC ..... *G09G 2380/02* (2013.01); *H04N 21/4882* (2013.01); *H04N 21/8133* (2013.01)

(56) References Cited

U.S. PATENT DOCUMENTS

| | | | |
|---|---|---|---|
| 2005/0176470 A1* | 8/2005 | Yamakawa | G09G 3/001 455/566 |
| 2012/0011437 A1* | 1/2012 | James | G06F 1/1643 715/702 |
| 2013/0275910 A1* | 10/2013 | Kim | G06F 1/1647 715/800 |
| 2014/0380186 A1 | 12/2014 | Kim et al. | |
| 2015/0029229 A1 | 1/2015 | Voutsas | |
| 2015/0220119 A1 | 8/2015 | Seo et al. | |
| 2016/0112667 A1 | 4/2016 | Park et al. | |

* cited by examiner

DISPLAY DEVICE

CROSS REFERENCE TO THE RELATED APPLICATIONS

This application is a Continuation of U.S. patent application Ser. No. 16/011,029 filed on Jun. 18, 2018, which is a Continuation of U.S. patent application Ser. No. 15/225,993 filed on Aug. 2, 2016 (now U.S. Pat. No. 10,013,955 issued on Jul. 3, 2018), which claims the priority benefit under 35 U.S.C. § 119(a) to Korean Patent Application No. 10-2015-0142999 filed in the Republic of Korea on Oct. 13, 2015, all of which are hereby expressly incorporated by reference into the present application.

BACKGROUND OF THE INVENTION

Field of the Invention

The present invention relates to a display device, and more particularly, to a display device having a flexible display.

Discussion of the Related Art

Generally, a display device includes a function of receiving, processing and displaying images that can be watched by a user. For instance, the display device receives a broadcast selected by a user from broadcast signals transmitted by a broadcasting station, separates an image signal from the received signal, and then displays the image signal on a display.

Recently, functions of a display device have been considerably diversified owing to the developments of the broadcasting technology and the network technology, and performance of the device has been correspondingly improved. In particular, the display device has been developed to provide a user with various contents as well as with a simply broadcasted content. For instance, the display device can provide not only programs received from a broadcasting station but also games, music listening, internet shopping, user-customized information and the like using various applications. In order to perform the extended functions, the display device is basically connected to other devices or networks using various communication protocols and can provide a user with ubiquitous computing. In particular, a mobile terminal has been evolved into a smart device that enables the connectivity to networks and the ubiquitous computing.

Meanwhile, a flexible display capable of considerable deformation with sufficient elasticity has been developed recently. Such a flexible display can be deformed enough to be rolled up into a body of the display device. A display device accommodates a rolled-up flexible display and can project the display in a desired size out of its body. Hence, the display device can have a compacter structure using the flexible display.

Generally, an appropriate size of a screen may be changed depending on a size or quantity of a content or information provided by a display device. By adjusting a size of a display projected (or, rolled out) or expanded from a body, the display device can control a size of a screen formed by the display as well. Yet, if the display is expanded to form a size failing to be appropriate for a screen size required by information to be provided, the display device may be unable to provide a user with the information appropriately. In particular, if the display is projected greater or smaller than a size of a screen required by the provided information, it may be considerably inconvenient for the user to watch or view the provided information. Therefore, the display device needs to control the size of the display to form a screen in an appropriate size in accordance with a quantity of the provided information.

SUMMARY OF THE INVENTION

Accordingly, embodiments of the present application are directed to a display device that substantially obviates one or more problems due to limitations and disadvantages of the related art.

One object of the present application is to provide a display device, which is configured to form a screen in a size appropriate for a quantity of provided information.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a display device according to one embodiment of the present application may include a body, a roller rotatably installed in the body, a flexible display configured to be wound or unwound from the roller in response to a rotation of the roller, and a controller configured to change a screen size for displaying an information related to a prescribed content in response to a winding or an unwinding of the flexible display, the controller configured to execute a multitude of modes for displaying different quantities of information according to the changed screen sizes, respectively.

Effects obtainable from the present invention may be non-limited by the above mentioned effect. And, other unmentioned effects can be clearly understood from the following description by those having ordinary skill in the technical field to which the present invention pertains. Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present application will become more fully understood from the detailed description given herein below and the accompanying drawings, which are given by illustration only, and thus are not limitative of the present application, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such a term herein is merely intended to facilitate description of the specification, and the term itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" or "accessing" another element, the element can be directly connected with or access the other element or intervening elements may also be present. In contrast, when an element is referred to as being "directly connected with" or "directly accessing" another element, there are no intervening elements present.

A singular representation may include a plural representation unless it represents a definitely different meaning from the context. Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present application includes a combination of features, numerals, steps, operations, components, parts and the like partially omitted from the related or involved features, numerals, steps, operations, components and parts described using the aforementioned terms unless deviating from the intentions of the disclosed original invention.

The features of a display device described in the present specification are applicable to various devices capable of adjusting a size of a display itself. Examples of such display devices having size-adjustable displays may include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

Figure 1:
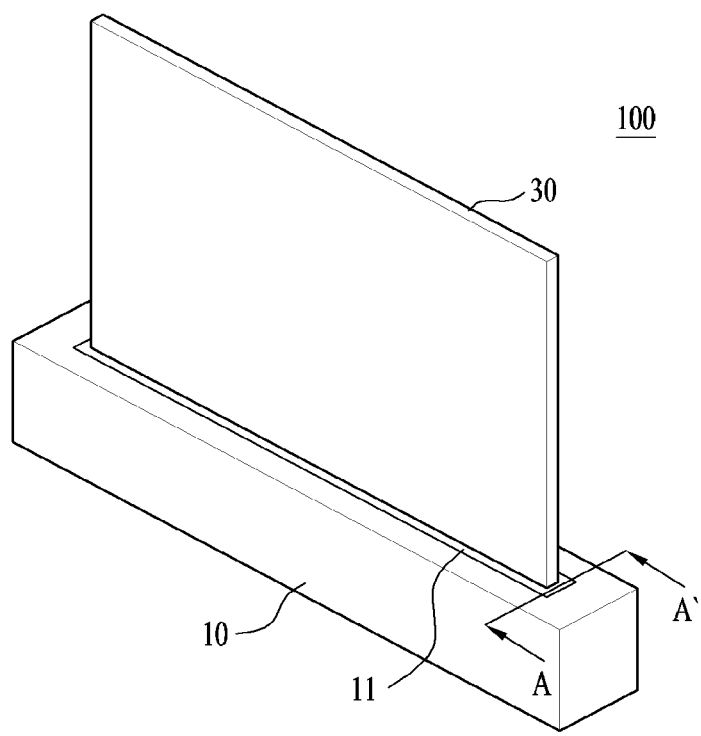
FIG. 1 is a perspective diagram to illustrate a structural configuration of a display device described in the present application.
Figure 2:
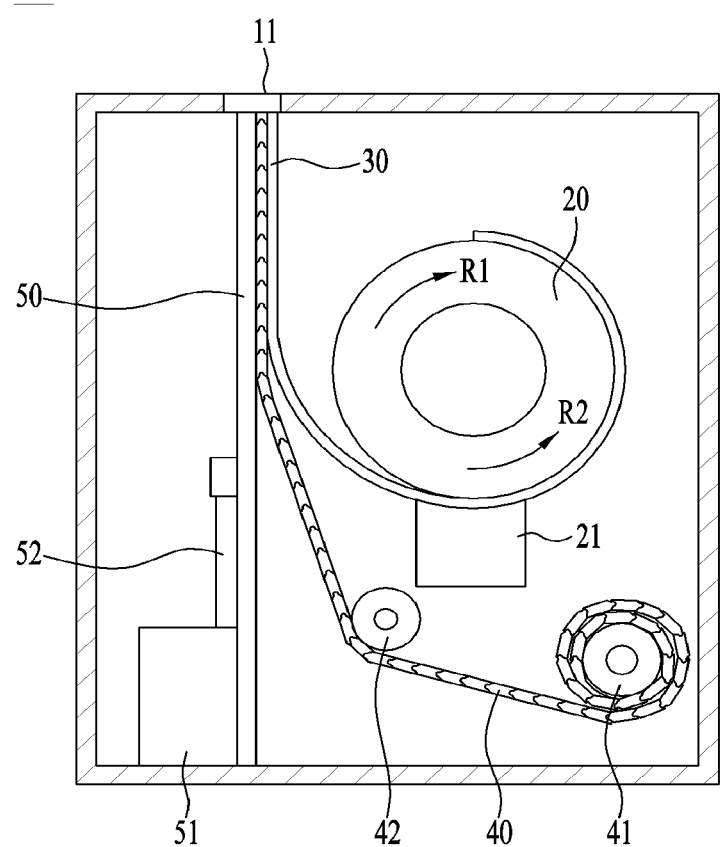
FIG. 2 is a cross-sectional diagram to illustrate one example of a display device obtained along a cutting line A-A' shown in FIG. 1.
Figure 3:
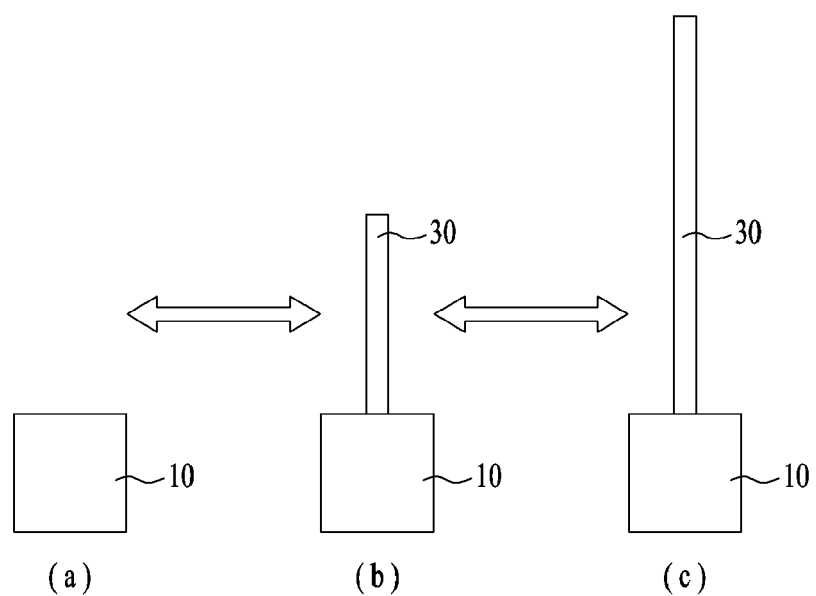
FIG. 3 is a lateral diagram to illustrate expansion and retraction of a display of a display device.

FIG. 1 is a perspective diagram to illustrate a structural configuration of a display device described in the present application, FIG. 2 is a cross-sectional diagram to illustrate one example of a display device obtained along a cutting line A-A' shown in FIG. 1, and FIG. 3 is a lateral diagram to illustrate expansion and retraction of a display of a display device. A structure of a display device is described in detail with reference to the above-drawings as follows.

Referring to FIG. 1, a display device 100 can have a body 10. And, the body 10 may include a housing configured to accommodate various parts or components therein. In particular, the body 10 can accommodate a display 30 and various electronic parts for operating the display 30 for example.

Moreover, as shown in FIG. 2, the display device 100 includes a roller 20 installed in the body 10 to be rotatable. The roller 20 may include sleeves formed on both end portions of the roller 20 and the sleeves can be supported by bearings by being rotatable for the body 10. The roller 20 is connected to a motor 21 installed in the body 10 likewise. As shown in the drawing, the roller 20 can be rotated in a clockwise direction R1 or a counterclockwise direction R2 by the motor 21. Moreover, a gear train may be inserted between the motor 21 and the roller 20 to adjust a rotational speed of the roller 20.

The display device 100 includes the display 30 configured to display various contents and information related to the contents. For instance, the display 30 can display video contents, audio contents and other auxiliary or supplementary contents. The contents may include various information (e.g., a play time in a video content, a title of a content, etc.) associated with the contents. And, the display 30 can display the related information. The display 30 may include at least one of a liquid crystal display (LCD), a thin film transistor-liquid crystal display (TFT-LCD), an organic light emitting diode (OLED), a flexible display, a 3-dimensional (3D) display, an e-ink display, and combinations thereof.

In particular, the display 30 may include a display module and a window configured to cover the display module. The display module may include such a display device as LCD, OLED or the like and is the component that actually displays an image or video information. The window may be disposed on a portion of the display module exposed to a user, and more particularly, on a front side in the drawing, and can protect the display module externally. In addition to such a protective function, the window should allow information, which is displayed on the display module, to be shown to the user. Hence, the window may be formed of material having proper rigidity and transparency. The display module may be directly attached to a backside of the window. The display module can be directly attached to the window in various ways. For instance, for the direct attachment, an adhesive agent may be used most conveniently.

In order to receive an input of a control command by a touch mechanism, the display 30 may also include a touch sensor which senses a touch to the display 30. A content input by the touch mechanism may include text, numerical value, or a menu item which can be indicated or designated in one of various modes. The touch sensor may be configured in a form of a film having a touch pattern by being disposed between the window and the display module, or a metal wire which is patterned directly on the backside of the window. Alternatively, the touch sensor may be integrally formed with the display module. For example, the touch sensor may be disposed on a substrate of the display module or within the display module. Thus, the display 30 may also form a touchscreen together with the touch sensor. In this instance, the touchscreen may serve as a user input unit. According to the complicated configuration of the display 30, in the accompanying drawings, the display 30 is illustrated as a single module or assembly consisting of multiple layers (i.e., parts).

Moreover, as shown in the drawing, the display 30 can be accommodated in the body 10 in order for the display device 100 to have a compact structure. Thus, the display 30 needs to be basically deformable in order to be accommodated in the body 10. Hence, the display device 100 can use a flexible display as the display 30.

The display 30 includes the flexible display that can be deformed by an external force. This deformation may include any of curving, bending, folding, twisting, rolling, and combinations thereof. A general flexible display is fabricated on a thin and flexible substrate capable of curving, bending, folding, twisting, rolling, and the like by keeping the aforementioned characteristics of the conventional flat panel displays, thereby being lightweight and not-easily-fragile. Moreover, as mentioned in the foregoing description, the flexible display 30 is combined with the touch sensor, thereby embodying a flexible touchscreen.

Owing to the deformable property, as shown in FIG. 2, the display 30 can be rolled by the roller 20. Depending on a rotational direction of the roller 20, the display 30 may be wound on the roller 20 or unwound from the roller 20. While the display 30 is unwound from the roller 20, it may be externally projected or expanded/rolled out of the body 10. On the contrary, while the display 30 is wound on the roller 20, it can be retracted or rolled in the body 10. In particular, as shown in FIG. 2, if the roller 20 is rotated in a clockwise direction R1, the display 30 can be expanded or rolled out of the body 10 through an opening 11 formed in the body 10 by being unwound from the roller 20. Hence, the display 30 accommodated in the body 10 shown in FIG. 3 (*a*) can be expanded out of the body 10 to form a screen in a prescribed size (FIG. 3 (*b*)). Moreover, if the roller 20 is further rotated in the clockwise direction R1, the display 30 can be further unwound from the roller 20. Hence, the display 30 can be externally projected in a larger size from the body 10, as shown in FIG. 3 (*c*), and can form a screen in a larger size. Further, if the roller 20 is rotated in a counterclockwise direction R2, the display 30 can be retracted or rolled in the body 10 through the opening 11 by being wound on the roller 20. Hence, the display 30 shown in FIG. 3 (*c*) can be retracted in the body 10 to have a relatively small size, whereby a screen having a smaller size can be formed (FIG. 3 (*b*)).

Moreover, if the roller 20 is further rotated in the counterclockwise direction R2, the display 30 can be further wound on the roller 20. Hence, the display 30 may not be projected from the body 10, as shown in FIG. 3 (*a*), and can be completely accommodated in the body 10. As mentioned in the foregoing description, the display device 100 can control an expansion of the display 30 in a necessary size, thereby forming a screen in a desired size. Moreover, when the display 30 is not used, it can be completely accommodated in the body 10. While the display 30 is used, it is expanded in a necessary size only. Thus, the display device 100 can have a compact structure. Eventually, a size of a screen formed on the display 30 can be variably changed depending on winding or unwinding the flexible display 30.

The display device 100 may include a deformation detection sensor capable of sensing a deformation of the flexible display 30. The deformation detection sensor is provided to the flexible display 30 or the body 10 and can sense information related to the deformation of the flexible display 30. In this instance, the information related to the deformation may include a deformed direction of the flexible display 30, a deformed extent of the flexible display 30, a deformed location of the flexible display 30, a deformed time of the flexible display 30, an acceleration for restoring the deformed flexible display 30, and the like. And, the information related to the deformation may include various information that can be sensed due to the flexure or bending of the flexible display 30. Thus, the detected or sensed information may be used to control the winding and unwinding of the display 30, i.e., the expansion and retraction of the display 30 in a controller 170 that will be described later with reference to FIG. 4. Moreover, the display device 100 may include a size detection sensor configured to detect or sense a size of a screen that is variable in accordance with the winding or unwinding the display 30. Like the deformation detection sensor, the size detection sensor may be installed in the flexible display 30 or the body 10. Based on the information sensed by the size detection sensor, the controller 170 shown in FIG. 4 can control information to be displayed on a screen actually exposed from the body only.

Meanwhile, in the general display device 100, the display 30, and more particularly, a rear part of the display device 100 can be protected by the housing. Yet, a front part of the display 30 expanded from the display device 100 of the present application is protected by the window, whereas a rear part of the display 30 may be exposed. Since the display 30 contains sensitive electronic parts and circuit boards, it should be protected appropriately to prevent malfunctions or failures. Hence, as shown in FIG. 2, the display device 100 may include a cover 40 configured to cover the rear part of the expanded display 30. The cover 40 may include a multitude of links connected to each other.

Each of the links may have a width corresponding to a width of the display 30. Also, the connected links, i.e., the cover 40 may for a single plate configured to cover the rear part of the display 30. Since a prescribed one of the links is pivotable on another link, as shown in the drawing, the cover 40 may be wound on the first roller 41 and guided to a rear side of the display 30 by the second roller 42. While the display device 100 is operating, if the display 30 is expanded, the first roller 41 is rotated so as to unwind the cover 40. The unwound cover 40 is guided by the second roller 42 so as to be attached to the rear part of the display 30.

Hence, as the cover 40 is expanded or rolled out of the body 10 together with the display 30, it can protect the rear part of the display 40. Further, if the display 30 is retracted or rolled in, the first roller 41 is rotated in a reverse direction so as to separate the cover 40 from the display 30. The separated cover 40 can be then wound on the first roller 41 by being guided by the second roller 42. With respect to the cover 40, the first roller 41 can be driven by the motor 21 together with the roller 20 and a separate motor for driving the first roller 41 may be installed in the body 10.

Meanwhile, it may be difficult for the display 30 to maintain its expanded state due to flexibility of its own. Hence, the display device 100 may include a supporter 50 configured to support the expanded display 30. In particular, the support 50 may be expanded out of the body 10 through the opening 11 by the motor 51 and a supplementary supporter 52 connected to the motor 51. Hence, the support 50 can be expanded out of the body 10 together with the display 30. Thus, the expanded display 30 can display a content thereon for a user by being stably supported by the supporter 50.

Figure 4:
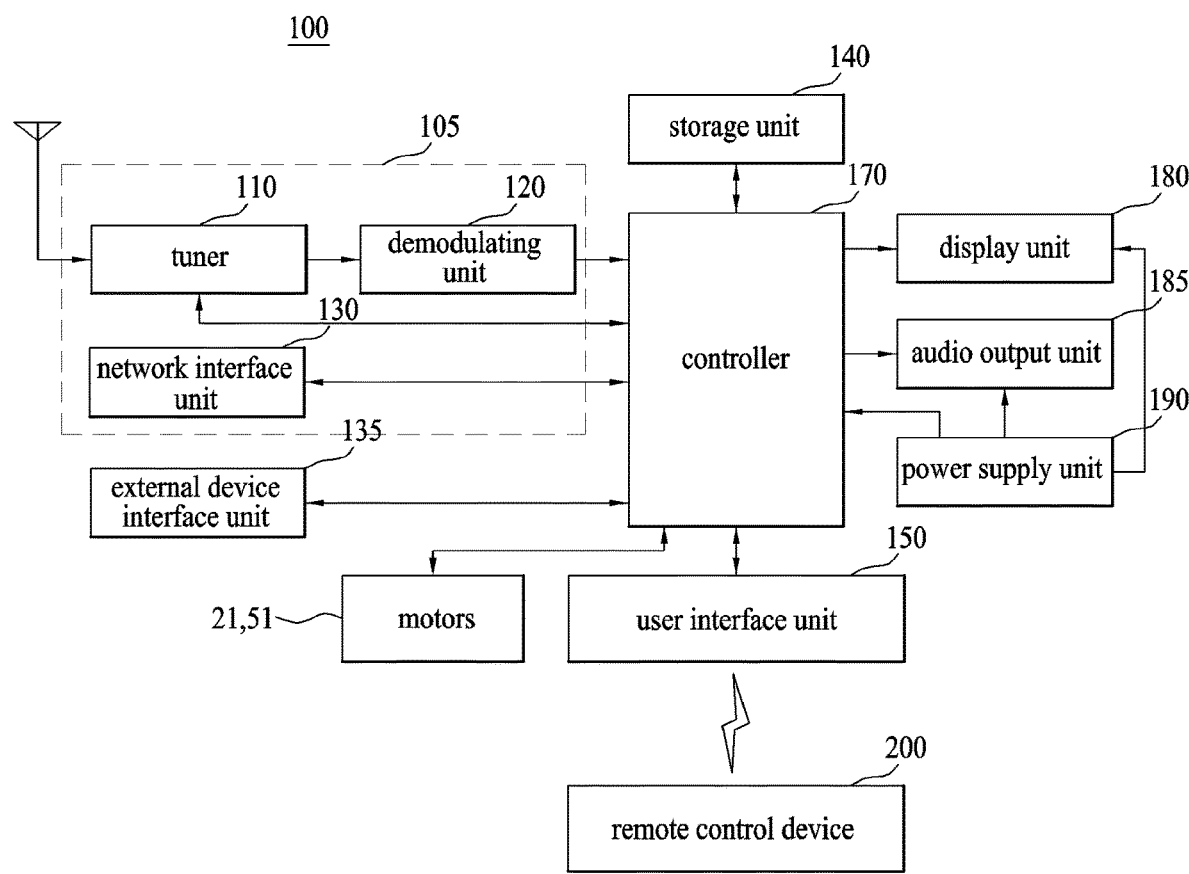
FIG. 4 is a block diagram to illustrate a functional configuration of a display device described in the present application.

In continuation with the structural configuration of the display device 100 mentioned in the above description, a functional configuration of the device 100 is described in detail with reference to the related drawings as follows. With respect to this, FIG. 4 is a block diagram to illustrate a functional configuration of a display device described in the present application. Moreover, since FIG. 4 shows components according to the function of the device 100, all components failing to be described as separate physical devices may include electronic circuits and processors provided onto a substrate or circuit board.

Referring to FIG. 4, a display device 100 may include a broadcast receiving unit 105, an external device interface unit 135, a storage unit 140, a user input interface unit 150, a controller 170, a display unit 180, an audio output unit 185, a power supply unit 190, and the like. It is appreciated that implementing all of the components shown in FIG. 4 is not a requirement, and that greater or fewer components may alternatively be implemented. Moreover, the real shapes and structures of the aforementioned components are not illustrated all but the shapes and structures of some significant components are shown in the drawings. Yet, it is apparent to those skilled in the art that components described without being illustrated in FIG. 4 can be included in the display device 100 to implement the functions of a display device 100.

The broadcast receiving unit 105 may include a tuner 110, a demodulating unit 120 and a network interface unit 130. Of course, if necessary, the broadcast receiving unit 105 can be designed not to include the network interface unit 130 by including the tuner 100 and the demodulating unit 120. On the contrary, the broadcast receiving unit 105 can be designed to include the network interface unit 130 by not including the tuner 100 and the demodulating unit 120.

The tuner 110 selects an RF (radio frequency) broadcast signal corresponding to a channel selected by a user or an RF broadcast signal corresponding to every pre-saved channel from RF broadcast signals received through an antenna. The tuner 110 converts the selected RF broadcast signal into an intermediate frequency signal or a baseband video or audio signal. For instance, if the selected RF broadcast signal is a digital broadcast signal, the tuner 110 converts it into a digital IF (DIF) signal. For instance, if the selected RF broadcast signal is an analog broadcast signal, the tuner 110 converts it into an analog baseband video or audio signal (CVBS/SIF). In particular, the tuner 110 can process both of the digital broadcast signal and the analog broadcast signal. The analog baseband video or audio signal (CVBS/SIF) output form the tuner 110 can be directly input to the controller 170. And, the tuner 110 can receive RF broadcast signal of a signal carrier according to ATSC (advanced television system committee) or RF broadcast signal of a plurality of carriers according to DVB (digital video broadcasting). Meanwhile, the tuner 110 sequentially selects RF broadcast signals of all broadcast channels saved through a channel memory function from RF broadcast signals received through the antenna and can then convert the selected signals into intermediate frequency signals or baseband video or audio signals.

The demodulating unit 120 performs a demodulation operation by receiving the digital IF signal (DIF) converted by the tuner 110. For instance, if the digital IF signal output from the tuner 110 follows ATSC, the demodulating unit 120 may perform 8-VSB (8-Vestigial Side Band) demodulation. And, the demodulation 120 can perform channel decoding. Thus, the demodulating unit 120 includes a Trellis decoder, a de-interleaver, a Reed-Solomon decoder and the like and can perform Trellis decoding, de-interleaving, Reed-Solomon decoding and the like. For instance, if the digital IF signal output from the tuner 110 follows DVB, the demodulating unit 120 may perform COFDMA (coded orthogonal frequency division modulation) demodulation for example. Moreover, the demodulating unit 120 may perform channel decoding. Thus, the demodulating unit 120 includes a convolution decoder, a de-interleaver, a Reed-Solomon decoder and the like and can perform convolution decoding, de-interleaving, Reed-Solomon decoding and the like.

The demodulating unit 120 performs the demodulation and the channel decoding and can then output a stream signal (TS). In this instance, the stream signal may include a signal generated from multiplexing a video signal, an audio signal and/or a data signal with each other. For instance, the stream signal may include MPEG-2 TS (transport stream) in which a video signal of MPEG-2, an audio signal of Dolby AC-3 and the like are multiplexed with each other. In particular, the MPEG-2 TS may include 4-byte header and 184-byte payload. Meanwhile, the above-described demodulating unit 120 can be separately provided according to ATSC and DVB. In particular, the demodulating unit 120 can be provided by including an ATSC demodulating unit and a DVB demodulating unit. The stream signal output from the demodulating unit 120 can be input to the controller 170. The controller 170 performs demultiplexing, video/audio signal processing and the like and can then output a video and an audio to the display unit 180 and the audio output unit 185, respectively.

The external device interface unit 135 can connect the display device 100 to an external device. Thus, the external device interface unit 135 may include an A/V input/output unit and a wireless communication unit. The external device interface unit 135 can be connected to such an external device as a DVD (digital versatile disk) player, a Blu-ray player, a game player, a camera, a camcorder, a computer (notebook) and the like by wire/wireless. The external device interface unit 135 forwards a video, audio and/or data signal externally input through the connected external device to the controller 170 of the display device 100. And, the external device interface unit 135 can output the video, audio and/or data signal processed by the controller 170 to the connected external device. Thus, the external device interface unit 135 may include an A/V input unit and a wireless communication unit. In order to input video and audio signals of the external device to the display device 100, the A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

In addition, the wireless communication unit can perform a short range wireless communication or a near field communication. The display device 100 can be networked with other electronic devices according to communication protocols such as Bluetooth, radio frequency identification (RFID), infrared data association (IrDA), ultra wideband (UWB), ZigBee, and digital living network alliance (DLNA), and the like for example. The external device interface unit 135 is connected to various set-top boxes through at least one of the above-listed terminals and can then perform input/output operations with the connected set-top boxes. Meanwhile, the external device interface unit 135 receives an application or an application list in a nearby external device and can then forward the received application or the received application list to the controller 170 or the storage unit 140.

The network interface unit 130 provides an interface for connecting the display device 100 to a wire/wireless network including Internet network. The network interface unit 130 can have Ethernet terminal and the like for an access to the wire network for example. For an access to the wireless network, the network interface unit 130 can use communication protocols such as WLAN (Wireless LAN) (Wi-Fi), Wibro (Wireless broadband), Wimax (World Interoperability for Microwave Access), HSDPA (High Speed Downlink Packet Access), and the like. Through the accessed network or another network linked to the accessed network, the network interface unit 130 can transmit/receive data to/from another user or another electronic device. In particular, the network interface unit 130 can transmit some of content data saved in the display device 100 to a user or electronic device selected from other users or electronic devices previously registered at the display device 100. Meanwhile, the network interface unit 130 can access a prescribed webpage through the accessed network or another network linked to the accessed network. In particular, by accessing the prescribed webpage through the network, the network interface unit 130 can transceive data with a corresponding server. Besides, the network interface unit 130 can receive contents or data provided by a content provider or a network operator. In particular, through the network, the network interface unit 130 can receive contents (e.g., movies, songs, music videos, sports broadcasts, advertisements, games, VOD, broadcast signals, etc.) and information related to the contents provided by the content provider or the network operator. The network interface unit 130 can update information and files of firmware provided by the network operator. And, the network interface unit 130 can transmit data to Internet or content providers or network operators.

Through a network, the network interface unit 130 selects a desired application from applications open to the public and can then receive the selected application. For instance, if a game application is launched in a video display device, the network interface unit 130 can transmit/receive prescribed data to/from a user terminal networked with the video display device. And, the network interface unit 130 can transceive prescribed data with a server for storing game scores.

The storage unit 140 may store programs for signal various processing and controls in the controller 170 and may also store signal-processed video, audio and/or data signals. The storage unit 140 may perform a function of temporary storage of video, audio and/or data signals input from the external device interface unit 135 or the network interface unit 130. Moreover, the storage unit 140 can store information on a prescribed broadcast channel through a channel memory function. Moreover, the storage unit 140 can store an application or a list of applications input from the external device interface unit 135 or the network interface unit 130. Further, the storage unit 140 may store various platforms which will be described later.

The storage unit 140 can include storage media of one or more types, such as a flash memory type, a hard disk type, a multimedia card micro type, a card type memory (e.g. SD memory, XD memory, etc.), RAM, EEPROM, etc. The display device 100 plays content files (e.g., a video file, a still image file, a music file, a text file, an application file, etc.) and provides them to a user.

The user input interface unit 150 forwards a signal input by a user to the controller 170 or forwards a signal from the controller 170 to the user. For instance, the user input interface unit 150 receives such a control signal as a power on/off, a channel selection, a screen setting or the like from the remote control device 210 and then processes the received control signal. And, the user input interface unit 150 controls a signal from the controller 170 to be transmitted the remote control device 200. And, the user input interface unit 150 can forward a control signal, which is input from such a local key as a power key, a channel key, a volume key, a setting key or the like, to the controller 170. Moreover, for instance, the user input interface unit 150 may forward a control signal input from a sensing unit configured to sense a user's gesture to the controller 170 or may transmit a signal from the controller 170 to the sensing unit In this instance, the sensing unit may include at least one of a touch sensor, a voice sensor, a position sensor, a motion sensor and/or the like.

The controller 170 controls overall operations of the display device 100 in general. By processing signals, data, information and the like input or output through all the components shown in FIG. 4 or running an application program stored in the device 100, the controller 170 can provide a user with appropriate information or functions or process the information or functions. The device 100 may include a substrate or circuit board installed therein. In this instance, the substrate or circuit board is a component on which various electronic parts, and more particularly, various processors configuring the controller 170 are mounted together with other circuits and devices configured to assist the processors. And, the substrate or circuit board can be installed in the body 10. The respective components shown in FIG. 4 are directly installed in the substrate or circuit board to be controlled by the controller 170 or may be electrically connected to the substrate or circuit board by being installed in the body 10. Hence, the control 170 unit may be called one of various names such as a controller, a controlling device and the like, and can control the display device 100 and all components of the display device 100. Therefore, all operations and controls included in the detailed description of the present application can be regarded as features of the controller 170.

The controller 170 can generate and output a signal for a video or audio output by demultiplexing a stream input via the tuner 110, the demodulating unit 120 or the external device interface unit 135 or processing the demultiplexed signals. The video signal video-processed by the controller 170 may be input to the display unit 180 to be displayed as a video corresponding to the video signal. And, the video signal video-processed by the controller 170 may be input to an external output device via the external device interface unit 135.

The audio signal processed by the controller 170 may be input to the audio output unit 185 to be output as audio. The audio signal processed by the controller 170 may be input to an external output device via the external device interface unit 135. Besides, the controller 170 may include a demultiplexing unit, a video processing unit and the like.

The controller 170 can control overall operations in the display device 100. For instance, controller 170 can control the tuner 110 to be tuned to an RF broadcast corresponding to a user-selected channel or a previously saved channel. The controller 170 can control the display device 100 by a user command input via the user input interface unit 150 or an inner program. Particularly, the controller 170 accesses a network and controls a user-desired application or a list of applications to be downloaded to the display device 100. For instance, the controller 170 controls the tuner 110 to receive an input of a signal of a channel selected in accordance with a prescribed channel selection command received via the user input interface unit 150. The controller 170 may then process a video, audio and/or data signal of the selected channel. The controller 170 controls information on the user-selected channel and the like to be output via the display unit 180 and/or the audio output unit 185 together with the processed video signal and/or the processed audio signal. In another instance, the controller 170 may control a video signal and/or an audio signal, which is input from an external device such as a camera, a camcorder and the like via the external device interface unit 135, to be output via the display unit 180 and/or the audio output unit 185 in accordance with an external device video play command received via the user input interface unit 150.

The controller 170 can control the display unit 180 to display a video. For instance, the controller 170 can control the display unit 180 to display a broadcast video input via the tuner 110, an external input video input via the external device interface unit 135, a video input via the network interface unit 130 or a video saved in the storage unit 140. Further, the video displayed on the display unit 180 may include one of a still picture and a moving picture or one of a 2D image and a 3D image. Moreover, the controller 170 can control a content to be played. In this instance, the content may include one of a content saved in the display device 100, a received broadcast content, and an external input content input externally. And, the content may include at least one of a broadcast video, an external input video, an audio file, a still image, an accessed web screen and a document file.

If an application view item is entered, the controller 170 can display applications or a list of applications in the display device 100 or applications or a list if applications downloadable from an external network. The controller 170 can control an application, which is downloaded from the external network, to be installed and launched together with various user interfaces. Moreover, in response to user's selection, the controller 170 can control an image or video related to the launched application to be displayed on the display unit 180.

The controller 170 searches for user terminals networked with a video or image display device through the network interface unit 130, outputs a list of the found user terminals through the display unit 180, and can receive a signal for selecting a user terminal used as a user controller from the found user terminal list through the user input interface unit 150.

The controller 170 can control the motors 21 and 51 and can also control the operations of the roller 20, the cover 40 and the supporter 50 mentioned in the foregoing description under such controls. Moreover, based on the deformation of the flexible display 30 detected by the deformation detection means, the controller 170 can control the expansion and retraction of the display 30. In particular, according to the detected information, the controller 1709 can control the motors 21 and 51, the roller 20, the cover 40 and the supporter 50 for the expansion and retraction of the display 30. Moreover, according to the information sensed by the size detection sensor, the controller 170 can detect a real size of a screen formed by the winding or unwinding of the display 30. In particular, using the information provided by the size detection sensor, the controller 170 can control the information to be disposed on a screen of the display 30 actually exposed out of the body 10 only. Moreover, the controller 170 can turn off a portion of the display 30 hidden in the body 10. Under such control, the controller 170 can effectively reduce the power use and can also reduce the generated heat effectively.

Meanwhile, in order to detect user's gesture or motion, as mentioned in the foregoing description, the display device 100 can further include a sensing unit having at least one of a touch sensor, a voice sensor, a location sensor, and a motion sensor. Moreover, the sensing unit may include a camera to directly obtain user's motion or may use a different camera provided within home. A signal sensed by the sensing unit may be forwarded to the controller 170. Using the forwarded signal, the controller 170 can recognize a command according to user's gesture. Moreover, the controller 170 can confirm whether the user approaches the display device 100 or whether the user is present at home.

The display unit 180 corresponds to the display 30 mentioned in the foregoing description. Since the display unit 180 is described in detail already, additional description shall be omitted.

The audio output unit 185 receives an input of such a signal audio-processed by the controller 170 as a stereo signal, a 3.1 channel signal, a 5.1 channel signal, or the like and then outputs it as audio. And, the audio output unit 185 may be embodied into one of speakers of various types.

The power supply unit 190 supplies the corresponding power to the display device 100 overall. Particularly, the power supply unit 190 can supply power to the controller 170 possibly embodied into SOC (System On Chip), the display unit 180 for displaying images or video, and the audio output unit 185 for audio output. Moreover, the power supply unit 190 can provide power to the related components including the controller 170 to automatically initiate an operation of the display device 100 in accordance with an external command and a preset condition. Thus, the power supply unit 190 may include a converter configured to convert an AC power into a DC power. Meanwhile, for example, when the display unit 180 is embodied into an LCD (liquid crystal display) panel having a multitude of backlight lamps, the power supply unit 190 may further include an inverter capable of PWM operation for a luminance variation or a dimming activation.

The remote control device 200 transmits a user input to the user input interface unit 150. Thus, the remote control device 200 can use at least one of Bluetooth, RF (radio frequency) communication, IR (infrared) communication, UWB (ultra wideband), ZigBee and the like. The remote control device 200 receives a video signal, an audio signal, a data signal and/or the like output from the user input interface unit 150 and then displays the received signal(s) or outputs audio or vibration. For the above-described functions, the remote control device 200 may include such an input means as a physical button, a touchscreen or the like.

Meanwhile, the structure of the display device 100 mentioned in the foregoing description may simply enable the expansion & retraction of the display 30 to be controlled.

Yet, in order to provide a further improved function, it is necessary for the expansion & retraction to be associated with a type and quantity of the provided information. This needs to be supported by an appropriate control in consideration of the structure and characteristics of the display device 100. Moreover, in implementing an intended function, the display device 100 is basically accompanied by interaction with a user. Hence, optimization of various controls can achieve improvements of user environment and user interface of a user and an intended functional improvement more effectively and efficiently.

Furthermore, such user experiences as facilitation in using the smart device 100, convenience in using the smart device 100 and the like can be remarkably improved by the optimized controls. For this reason, a method of controlling the display device 100 shown in FIGS. 1 to 4 has been developed and is described in detail with reference to the related drawings in addition to FIGS. 1 to 4 as follows. Unless there are especially opposed descriptions, FIGS. 1 to 4 and the descriptions with reference to FIGS. 1 to 4 are basically included in and referred to for the description and drawings of the controlling method in the following.

Figure 10:
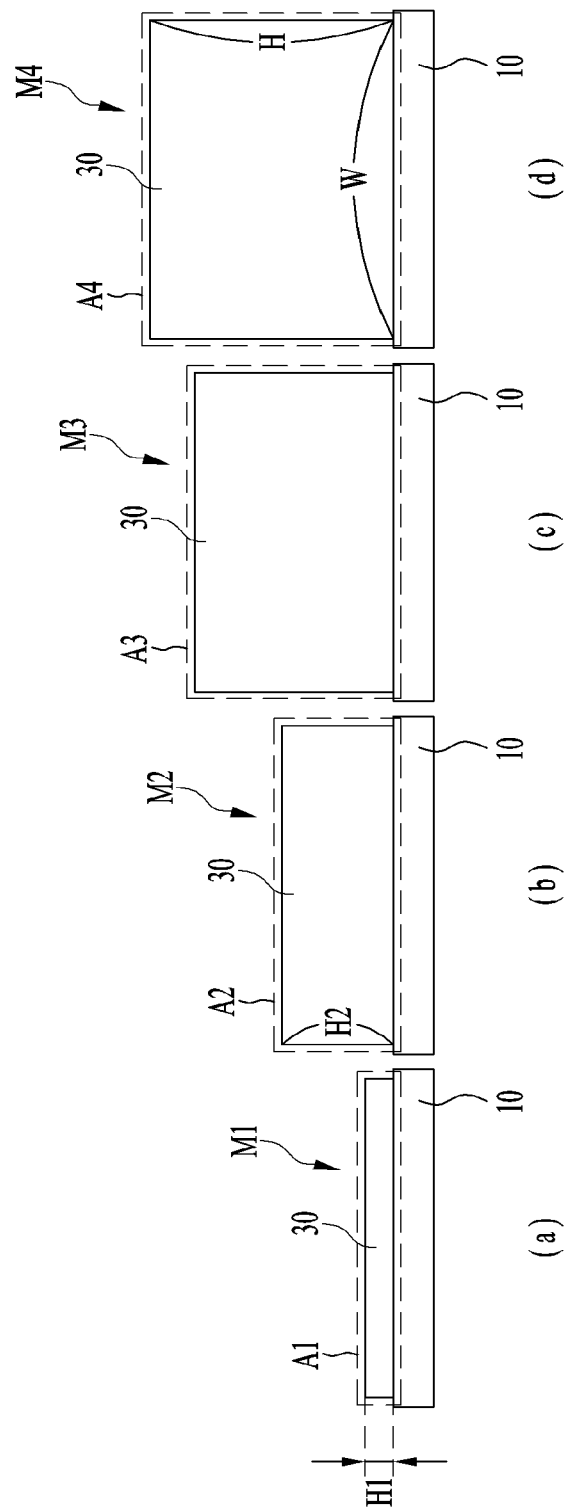
FIG. 10 is a schematic diagram to illustrate examples of various modes executed in a display device.

First of all, FIG. 10 is a schematic diagram to illustrate examples of various modes executed in a display device. Controlling methods described in the following and various modes included in the controlling methods can control operations of the components (i.e., various parts) described with reference to FIGS. 1 to 4 and can provide the intended functions based on such operations. Hence, operation and functions related to the controlling method may be regarded not only as the features of the controlling method but also as the features of all related structural components. In particular, the control unit (or processor) 170 can be called one of various names such as a controller, a controlling device and the like and can control all the components of the display device 100 to perform a prescribed operation. Therefore, the controller 170 substantially controls all methods and modes mentioned in the following description of the present application, whereby all the steps mentioned in the following description may become the features of the controller 1700. For such reasons, all the detailed steps and features in the following should be understood as the features of the controller 170 despite failing to be described as performed by the display device 100.

Generally, a content provided by the display device 100 and a quantity or size of information related to the provided content may vary, and a size of a screen appropriate to display such information may vary likewise. Yet, if the display device 100 provides a screen size inappropriate for an information to be provided, the information cannot be provided to a user appropriately. For instance, if a prescribed screen bigger than a screen required for a provided information is provided, the provided information cannot fit the screen and a considerable region remains empty. On the contrary, if a prescribed screen smaller than a screen required for a provided information is provided, the information may not be shown to a user in part. In this instance, the user may have inconvenience in viewing the provided information. Hence, it is necessary for the display device 100 to form a screen in a size appropriate for a quantity of a provided information. As mentioned in the foregoing description, a size of a formed screen may be determined depending on a size of the display 30 expanded from the body 10. For such a reason, the display device 100, and more particularly, the controller 170 of the display device 100 can control a size of the display 30 expanded from the body 10 in order to form a screen in a size appropriate for a quantity of a provided information.

In order to effectively adjust sizes of the expanded display 30 and screen, the controlling method specifies quantities of the provided information and sizes of the expanded display 30 (i.e., sizes of the screen) appropriate for them and can then define a pair of the specified information quantity and the appropriate display size as a single mode. In particular, the controlling method can include a multitude of modes respectively including the different information quantities and the appropriate sizes. Since the quantity of the information is determined according to a type of the information in general, the modes of the controlling method can also consider the type of the information for the adjustment of the expanded size of the display 30. Hence, in the controlling method, the display device 100, and more particularly, the controller 170 can be configured to perform a multitude of modes for expanding the display 30 in different sizes from the body 10 in order to form screens in appropriate sizes according to a quantity or type of the information provided by the device 100, and more particularly, by the device 100. In particular, the display device 100, and more particularly, the controller 170 is configured to change a size of a screen for display an information related to a prescribed content in accordance with the winding or unwinding of the display 30 and is also configured to perform a multitude of modes for displaying different quantities of information in accordance with the changed screen size. Moreover, since the display device 100 operates to display the provided information, the modes can include an operation of displaying the information on the display 30 in the adjusted size as well as an operation of the size adjustment of the expanded display 30.

Figure 11:
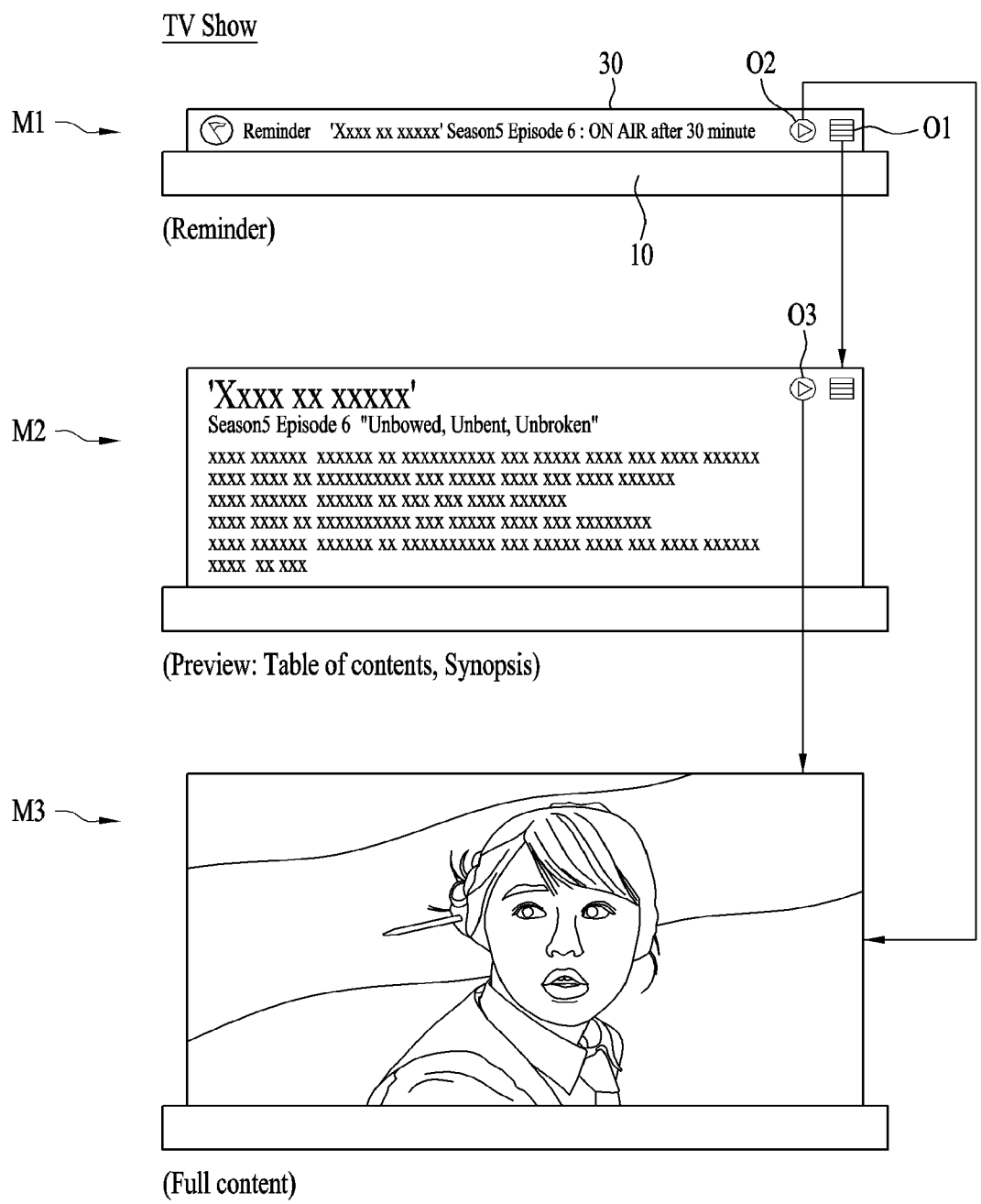
FIG. 11 is a schematic diagram to illustrate an operation when a display device provides one example of a video content.
Figure 12:
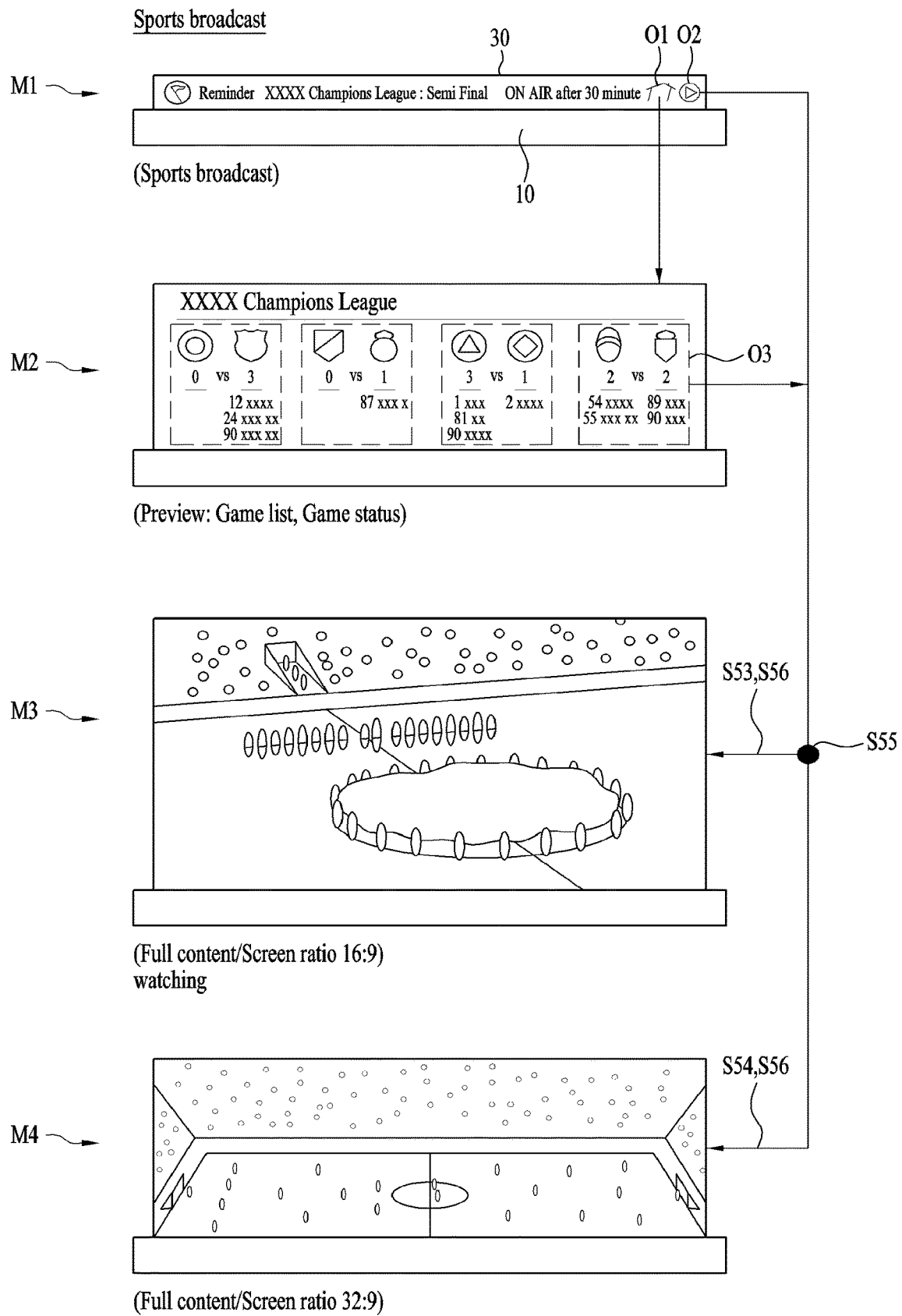
FIG. 12 is a schematic diagram to illustrate an operation when a display device provides another example of a video content.
Figure 13:
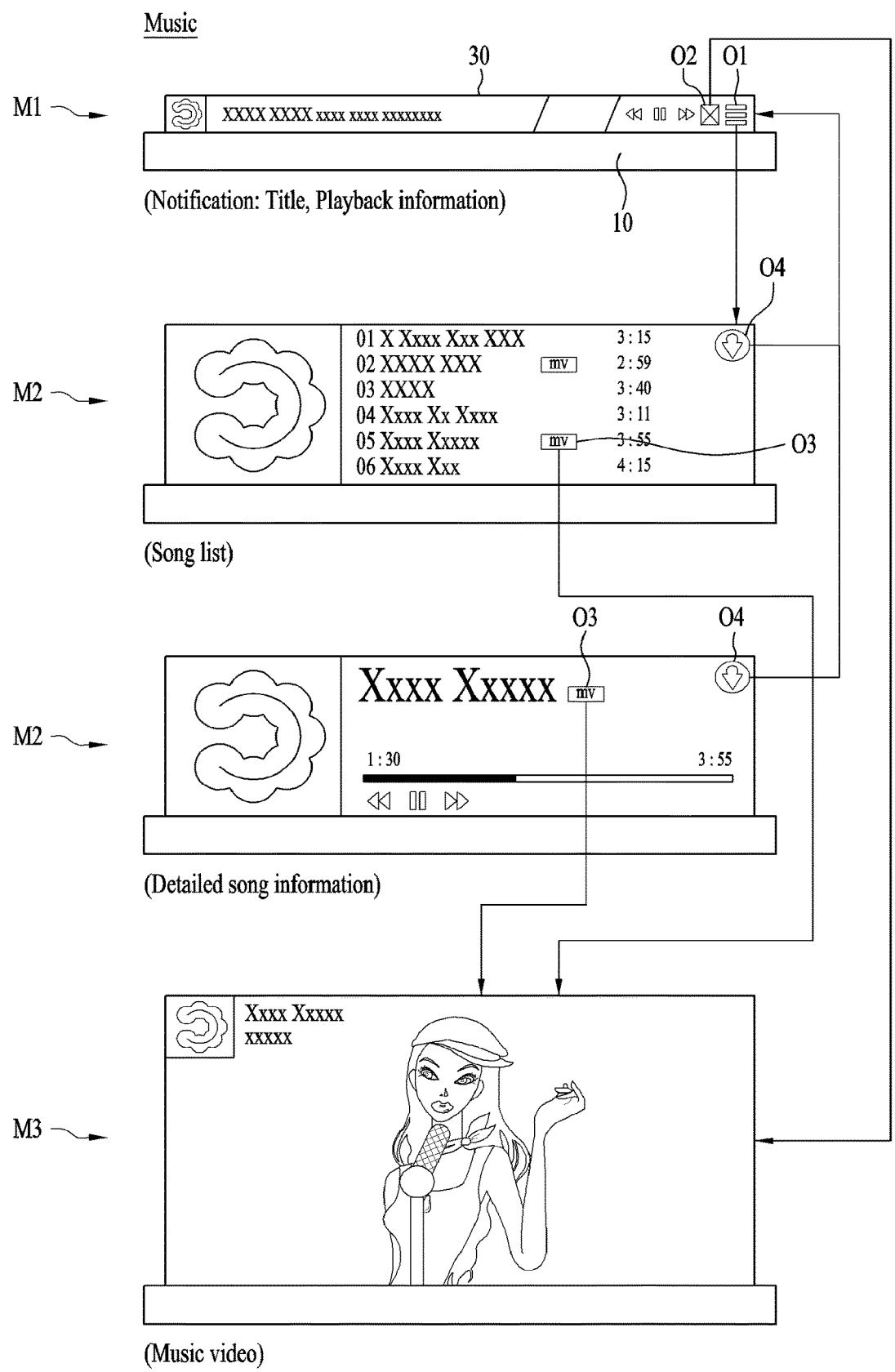
FIG. 13 is a schematic diagram to illustrate an operation when a display device provides one example of an audio content.
Figure 14:
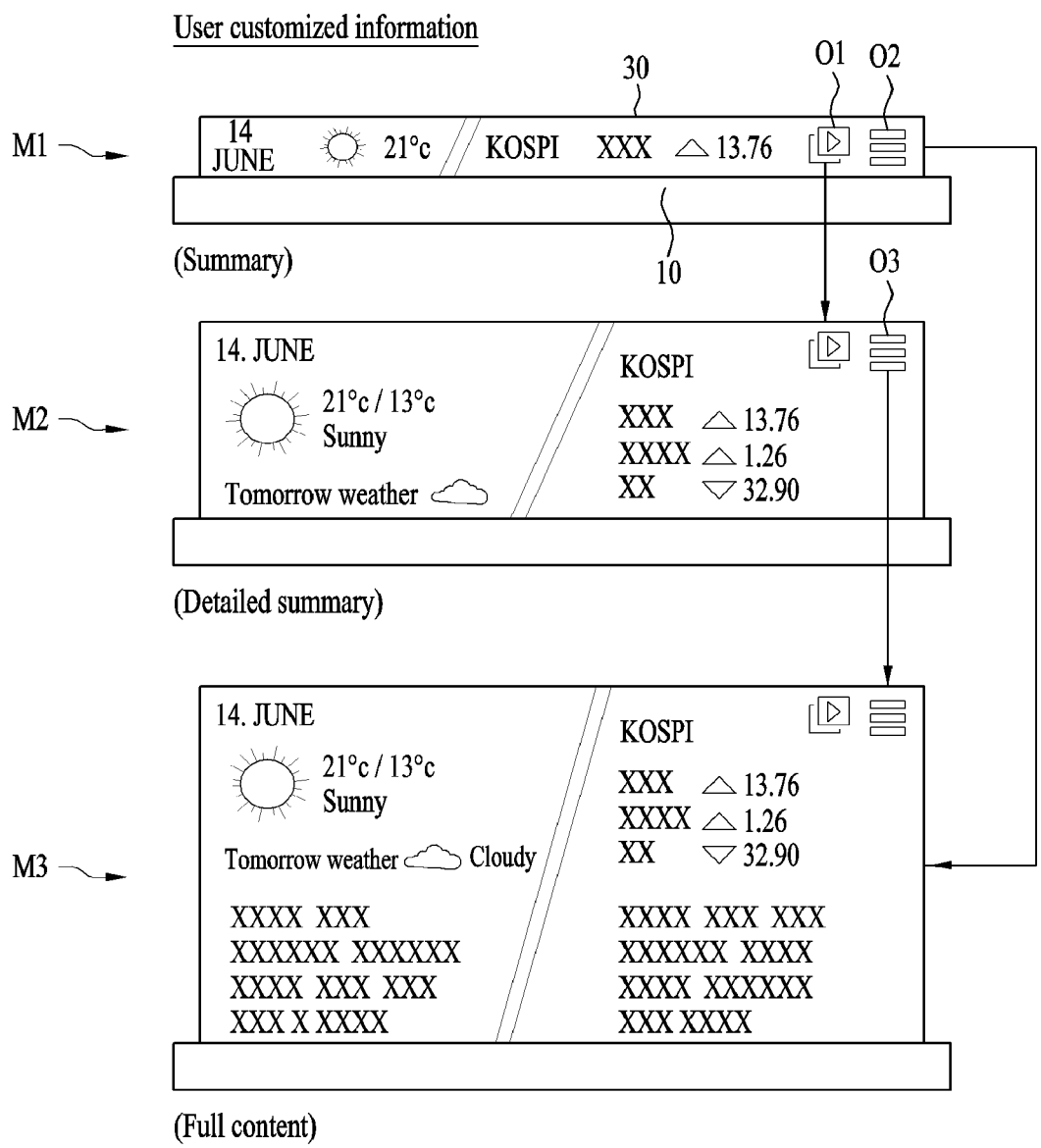
FIG. 14 is a schematic diagram to illustrate an operation when a display device provides one example of various supplementary contents.

For the better understanding of the controlling method according to the present application, the modes schematically mentioned in the foregoing description are described in detail with reference to FIG. 10 as follows. Moreover, for the description of the modes, FIGS. 11 to 14 are additionally referred to in the following. FIG. 11 is a schematic diagram to illustrate an operation when a display device provides one example of a video content, and FIG. 12 is a schematic diagram to illustrate an operation when a display device provides another example of a video content. FIG. 13 is a schematic diagram to illustrate an operation when a display device provides one example of an audio content, and FIG. 14 is a schematic diagram to illustrate an operation when a display device provides one example of various supplementary contents.

Basically, the display device 100 can perform the aforementioned modes prior to providing a prescribed content to a user. Moreover, each content can include various supplementary information related to the corresponding content as well as the content itself. Hence, the display device 100, and more particularly, each of the modes of the display device 100 can be configured to display not only the corresponding content but also supplementary information related to the corresponding content. And, as mentioned in the following description, each of the supplementary information can be defined as a terminology 'information'. In particular, the content may include a video content and an audio content. Moreover, the content may include a supplementary content configured to provide information useful for a user as well as a multimedia information. For instance, as shown in FIG. 11 and FIG. 12, a video content may include a TV show or a sports broadcast. Moreover, as shown in FIG. 13, an audio content may include a music or a music video. Finally, as shown in FIG. 14, a supplementary content may include a user-customized information or a living information. Besides, contents of various types can be provided to a user by the modes using the display device 100. Furthermore, the aforementioned video, audio and supplementary contents are accompanied by various information related to them and detailed features and examples of these information shall be handled in detail in the descriptions of the respective modes.

Referring to FIG. 10, first of all, such modes may include a first mode M1 that is most basic. If the first mode M1 is requested by various conditions including an auto execution and a manual execution, the controller 170 can control the device 100 to perform the first mode M1. In particular, the first mode M1 may be configured to display a prescribed first information on the display 30. Moreover, the first mode M1 can expand the display 30 in a first size A1 appropriate for displaying the first information from the body 10.

The first information does not include a content itself but may include a briefest information on the content. The first information plays a role in helping a user to use the content. In particular, the first information may include a reminder or notification of a content scheduled to be broadcasted or played. For instance, as shown in FIGS. 11 to 13, the first information may include a name of a content (e.g., TV show, Sports broadcast, music, etc.) to be broadcasted or played, a broadcast and play scheduled time of the content, a viewing or recording reservation of the content and the like. And, the first information may include not a summary of a multimedia content but a summary of a content for the purpose of providing a prescribed information substantial and useful for a user. For instance, as shown in FIG. 14, the first information may include a summary of a user customized information or a living information. And, all information related to a content to be provided or all information capable of specifying the content can be included in the first information. Moreover, since the first information is considerably brief, it may include information of 1 line or 2 lines. Hence, in order to fir a quantity and size of such information, the first size A1 may include screen sizes amounting to screen ratios, i.e., ratios (10:1~15:1) of width (W) to height (H).

The modes can include a second mode M2 shown in FIG. 10 as well. If the second mode M2 is requested based on a prescribed condition, the display device 100, and more particularly, the controller 170 can operate the device 100 in accordance with a preset second mode M2. In particular, the second mode M2 may be configured to display a prescribed second information on the display 30. And, the second mode M2 can expand the display 30 in a second size A2 appropriate for displaying the second information from the body 10.

Like the first information, the second information can include not a content itself but a brief information on a content to be provided and plays a role in helping a user to use the content. Yet, as the second information can include an information further detailed than the first information with respect to the content, it can be distinguished from the first information in a quantity of the provided information at least. In particular, the second information may correspond to an information inefficient to be provided in a screen size appropriate for the content itself despite being further detailed than the first information. In more particular, the second information may include a preview of a content scheduled to be broadcasted or played. For instance, as shown in FIG. 11, the second information may include a table of contents of a TV show, a synopsis of the TV shown and the like. As shown in FIG. 12, the second information may include a list of games currently performed in association with sports broadcasting and a summary of current statuses of such games. Moreover, as shown in FIG. 13, the second information may include a list of a currently played album or a detailed information of a prescribed song included in the album. Furthermore, as shown in FIG. 14, the second information may include a detailed summary of a user customized information or a living information. Besides, all information further detailed than the first information by being related to a content to be provided can be included in the second information. Meanwhile, the second information is brief but may be further detailed than the first information. For instance, the second information may include information over three lines, whereas the first information includes information of one or two lines. Hence, a height H2 of the display 30 or screen according to the second size A2 may be set at least three times greater than a height H1 of the display 30 or screen according to the first size A1. In order to be appropriate for a quantity of the second information actually, the second size A2 may include screen sizes having screen ratios 4:1 to 6:1.

Moreover, the modes can include a third mode M3 shown in FIG. 10 as well. If the third mode M3 is requested based on a prescribed condition, the display device 100, and more particularly, the controller 170 can control the display device 100 to perform a preset third mode M3. In performing the third mode M3, the third mode M3 may be configured to display a prescribed third information on the display 30. And, the third mode M3 can expand the display 30 in a third size A3 appropriate for displaying the third information from the body 10.

Unlike the first information or the second information, the third information may correspond to a content itself to be provided. In particular, the third information is not a simple related information but may correspond to a full content to be provided, and more particularly, to a full content of each of the video, audio and supplementary contents mentioned in the foregoing description. For instance, as shown in FIG. 11 or FIG. 12, the third information may include a TV show or a sports broadcast itself. Moreover, as shown in FIG. 13, the third information may include a music video of a prescribed song included in the album. Finally, as shown in FIG. 14, the third information may include a supplementary content itself such as a user customized information or a living information. Besides, various contents can be included in the third information. Recently, such a third information, i.e., a content itself is provided at a screen ratio of 16:9 in general. Hence, in the third mode M3, the third size A3 may include a screen size of a screen ratio of 16:9.

Meanwhile, the contents can have various screen ratios and resolutions in accordance with a type and purpose of a content in addition to the third size A3 mentioned in the foregoing description. Hence, in order to provide contents according to the various screen ratios or resolutions, the modes can include a fourth mode M4. In particular, if the fourth mode M4 is requested, the controller 170 can control the display device 100 to perform a preset fourth mode M4. In particular, the fourth mode M4 displays a prescribed fourth information on the display 30 can expand the display 30 in a fourth size A4 appropriate for displaying the fourth information from the body 10.

The fourth information may include a full content having a screen ratio or resolution different from that according to the preset third mode M3, i.e., the third information and the third size A3. For instance, as shown in FIG. 12, the fourth information according to the fourth mode M4 may include a sports broadcast content that provides a further panoramic view. Moreover, the fourth information according to the fourth mode M4 may include a movie or TV show that provides a more vivid screen according to the iMax reference. FIG. 10 shows the fourth size A4 of the fourth mode M4 according to the iMax reference. Hence, unlike the third size A3, the fourth size A4 may include a screen size of a screen ratio of 1.9:1~2.35:1. Moreover, the fourth size A4 may include a screen size of a screen ratio of 32:9 for the panoramic sports broadcasting. Besides, the fourth size A4 may have various screen ratios or resolutions according to a screen ratio or resolution of a provided content.

Figure 5:
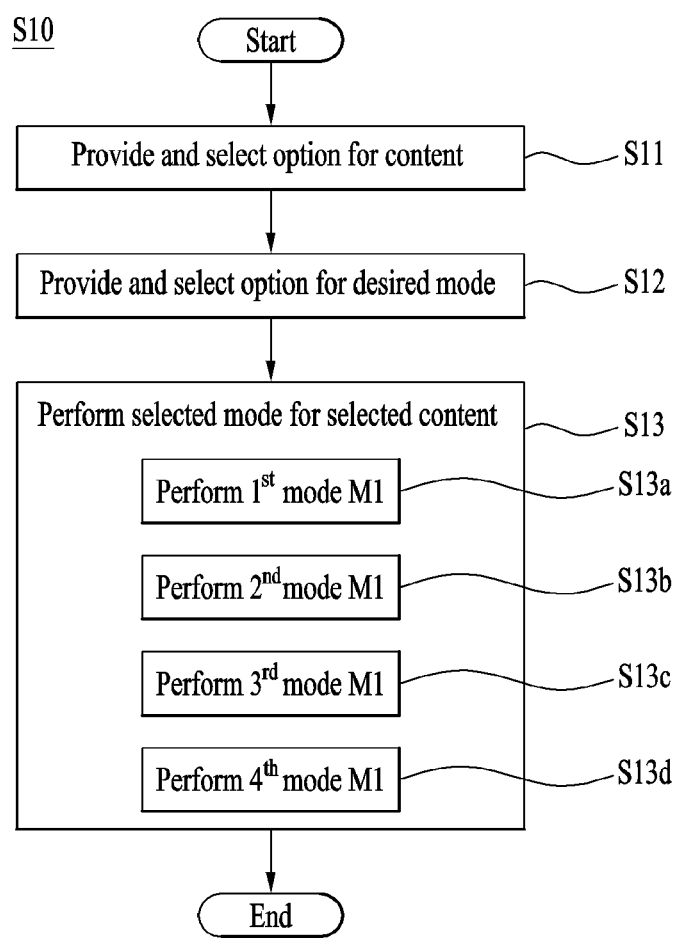
FIG. 5 is a flowchart of a method of manually executing modes of a display device.

In continuation with the description of the basic modes, a controlling method using such modes is described in detail with reference to the related drawings in addition to FIG. 10. FIG. 5 is a flowchart of a method of manually executing modes of a display device. A controlling method shown in FIG. 5 may become a most general method for activating the display device 100 according to the aforementioned modes. Such a controlling method is described in detail with reference to FIG. 5 together with FIGS. 11 to 14 as follows.

First of all, the display device 100, and more particularly, the controller 170 can provide a user with an option for providable contents (S11). Such an option may be provided in general when a power of the display device 100 is turned on. Moreover, the option may include a list of various contents, e.g., items indicating a video content, an audio content and a supplementary content shown in FIGS. 12 to 14. Moreover, the option may be provided in form of a virtual menu displayed on the display 30 by including a selectable icon, a shortcut and the like. And, the option may be provided as a physical button in the remote control device 200. If such an option is provided, a user can select a desired content (S11). For instance, the user can select a desired content from the displayed virtual menu suing various selection tools including the remote control device 200. Alternatively, the user can select a desired content by directly pressing physical buttons provided to the remote control device 200 or other devices.

If the desired content is selected, the display device 100 can provide an option for the modes M1 to M4 to the user (S12). Like the former option for the contents, the option may include a list including items indicating the modes or maybe provided as a virtual menu or a physical button. If the option is provided, the user can select a desired mode (S12). In particular, the user can select the desired mode from the virtual menu or may select a desired mode by pressing the physical button.

If the desired content and mode are selected, the display device 100 can perform the selected mode to provide an information related to the selected content (S13). In particular, in response to a user's selection, the display device 100 can perform the first mode M1, the second mode M2, the third mode M3 or the fourth mode M4 (S13a to S13d). In performing such a mode, in order to display a preset quantity of an information according to the selected mode, i.e., one of the first to fourth information, the display device 100 can expand the display 30 into a size appropriate for the information, and more particularly, into one of the first to fourth sizes.

As mentioned in the foregoing description, the steps S11 to S13 may be performed when a power of the display device 100 is initially turned on. Alternatively, the steps S11 to S13 may be performed while the display device 100 already performs one of the modes M1 to M4. In particular, the steps S11 to S13 can be manually performed in response to a user's request at any time in the course of operation of the display device 100. Moreover, if the steps S11 to S13 are performed in the course of performing a prescribed mode, options for the content and mode may be displayed on the display 30 together with one of the first to fourth information currently provided. In this instance, the option may or may not be overlapped with the provided information. If the option is not overlapped with the provided information, the display device 100 may additionally expand the display 30 in order to additionally create a screen on which the option will be displayed. By the manual mode execution S10 according to the steps S11 to S13, a user can enter a desired mode of a desired content at any time. Moreover, if a user desires to change a mode only, an option for the mode can be requested only. Hence, the steps S12 and S13 may be performed only.

Figure 6:
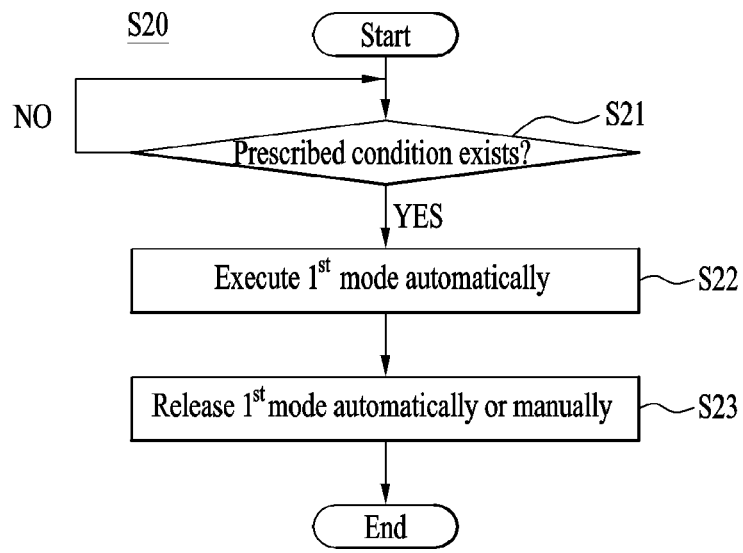
FIG. 6 is a flowchart of a method of automatically executing modes of a display device.

In contrast to the manual mode execution S10 in the description with reference to FIG. 5, the display device 100 can automatically perform a specific mode under a prescribed condition. A controlling method S20 for such an automatic mode execution is described in detail with reference to the related drawings as follows. FIG. 6 is a flowchart of a method of automatically executing modes of a display device. Such a controlling method is described in detail with reference to FIG. 6 together with FIGS. 11 to 14 as follows.

First of all, for an automatic specific mode execution, the display device 100 can determine whether a prescribed condition exists (S21). In particular, the device 100 can detect whether the prescribed condition actually occurs or whether the prescribed condition is met. Such a condition may include one of a case that a preset time arrives, a case that a user is present at home, a case that a user approaches the display device 100, and a case that a user turns on a power of the display device 100. Besides, various cases may be included in the conditions according to user's settings.

If the above-mentioned conditions exist, the display device 100 can perform one of the modes M1 to M4 according to a setting. Yet, since the first mode M1 provides a brief first information that can be understood by a user easily and instantly, if a prescribed one of the above-mentioned conditions exists, it may be preferable that the display device 100 automatically performs (or executes) the first mode M1 (S22). For instance, as shown in FIG. 11, if a user makes a viewing or recording reservation of a specific TV show, if a broadcast time of the specific TV show approaches, the display device 100 can provide the user with the aforementioned first information through the execution of the first mode M1. Although the viewing or recording reservation is not made, the display device 100 can automatically perform the first mode M1 to provide the first information prior to each new TV show. Moreover, if a user exists at home or approaches the device 100, the display device 100 can automatically perform the first mode M1 to provide the first information on the TV show. The example of the steps S21 and S22 shown in FIG. 11 may be similarly applicable to other contents shown in FIGS. 12 to 14. Particularly, since the supplementary content shown in FIG. 14 includes the customized information and the living information for the user, e.g., the weather information and the stock market information, it is important for them to be directly delivered to the user. Hence, if the user exists at home or approaches the display device 100, the display device 100 can perform the first mode M1 on the supplementary content.

Meanwhile, since the first mode M1 provides a user with an instantly recognizable information, it may be appropriate as an initial operation of the display device 100. Hence, referring to FIG. 5, when the power of the display device 100 is turned on, despite that the manual mode execution S10 can be performed, the operation of turning on the power may become the condition for the auto execution determined by the step S21 in the controlling method shown in FIG. 6. In particular, if the power of the display device 100 is turned on, the first mode M1 may be directly performed (or executed) (S22).

After the performing step S22, if a prescribed time expires, the display device 100 can automatically release the first mode M1 (S23). Further, the first mode M1 may be manually released by a user's manipulation (S23). If the first mode M1 is released or interrupted, the display device 100 can completely retract the display 30 into the body 10.

Although the performing step S22 describes the auto execution of the first mode M1, the mode automatically executed according to a user's setting may be changed. In particular, one of the second to fourth modes M2 to M4 may be automatically performed under the above-mentioned condition according to the user's setting. Since a desired mode can be automatically performed or executed under a prescribed condition by the steps S21 to S23, a user can use the display device 100 more conveniently.

Figure 7:
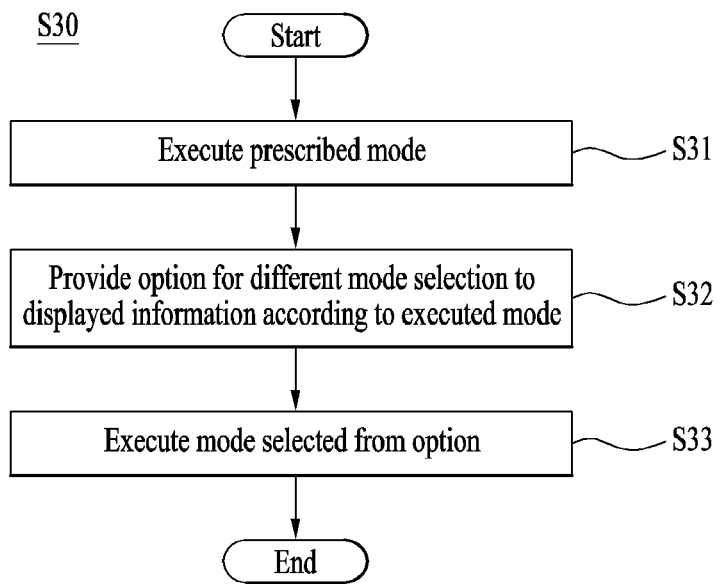
FIG. 7 is a flowchart of a method of switching a display device from one mode to another mode.

In addition to the manual and auto mode executions S10 and S20 mentioned in the foregoing description, the display device 100 can switch from a previously executed mode to another mode for user's convenience. A controlling method S30 for such a mode switching is described in detail with reference to the related drawings as follows. FIG. 7 is a flowchart of a method of switching a display device from one mode to another mode. Such a controlling method is described in detail with reference to FIG. 7 together with FIGS. 11 to 14 as follows.

First of all, the display device 100 can perform (or execute) one of the modes M1 to M4 (S31). In the performing step S31, the display device 100 can perform the corresponding mode according to the manual mode execution S10 or the auto mode execution S20 mentioned in the foregoing description. In particular, the corresponding mode may be executed in response to a user's manual selection or may be executed automatically under a prescribed condition.

If the mode is performed (or executed), the display device 100 can provide an option for selecting a mode different from the currently performed mode (S32). In particular, in the providing step S32, the display device 100 can provide a user with an option for enabling a switching from a currently performed mode to another mode. As mentioned in the foregoing description, whereas the manual mode execution S10 provides an independent option separated from the provided information, as shown in FIG. 11 and FIG. 14, the display device 100 provides options O1 to O4 capable of selecting a different mode by being included in the information provided according to the currently performed mode, i.e., one of the first to fourth information in the providing step S32. Moreover, as shown in the drawing, all the modes M1 to M4, i.e., the first to fourth information can include the options O1 to O4 to enable the switching in all the modes M1 to M4. In particular, the option in the providing step S32 may become an option integrally formed with the first to fourth information.

In more particular, the first mode M1 can provide a user with a first information that is most basic and intuitive in association with a content to be provided. Hence, the user can easily determine a desired mode from the first mode M1. For such a reason, the first information of the first mode M1 may include an option capable of entering all the other modes M1 to M4. For instance, as shown in FIGS. 11 to 14, the first mode M1, i.e., the first information may include options O1 and O2 capable of entering the second mode M2 and the third mode M3. Moreover, if necessary, the first mode M1 may include the option O1 or the option O2 selectively. Besides, the first mode M1, i.e., the first information can provide an option for performing the fourth mode M4. Moreover, since the second mode M2 provides an information more detailed than the first information of the first mode M1 already, most of users may desire to perform the third mode M3 or the fourth mode M4 from the second mode M2 for more information. Hence, the second mode M2, i.e., the second information may include an option capable of entering the third mode M3 and/or the fourth mode M4. For instance, as shown in FIGS. 11 to 14, the second mode M2, i.e., the second information can include an option O3 capable of entering the third mode M3 or may include an option capable of directly entering the fourth mode M4. In case of the sports broadcast shown in FIG. 12, the current statuses of the currently performed games provided to the second mode M2 may become the option O3. If a prescribed one of the current statuses is selected, the third mode M3 or the fourth mode M4 for the corresponding game may be entered. Moreover, if necessary, the second mode M2, i.e., the second information can provide an option O4 capable of entering the first mode M1. As shown in FIG. 13, in case of an audio content, if a user does not desire to watch a music video or have a detailed information on an album, it may be unnecessary to continue to keep the expanded display 30 according to the second mode M2. Hence, by selecting the option O4 for providing a minimized interface and information only, it may go back to the first mode M1. Furthermore, the third information of the third mode M3 may include an option for returning to the first mode M1 and/or the second mode M2.

After the providing step S32, if the user selects a specific mode using the options O1 to O4, the display device 100 can perform or execute the selected mode (S33). As mentioned in the foregoing description, the mode switching S30 enables a sequential switching from a predetermined mode to other modes in consideration of user's behavior patterns. Moreover, the mode switching S30 may enable a free switching among the modes in response to a user's request.

Figure 8:
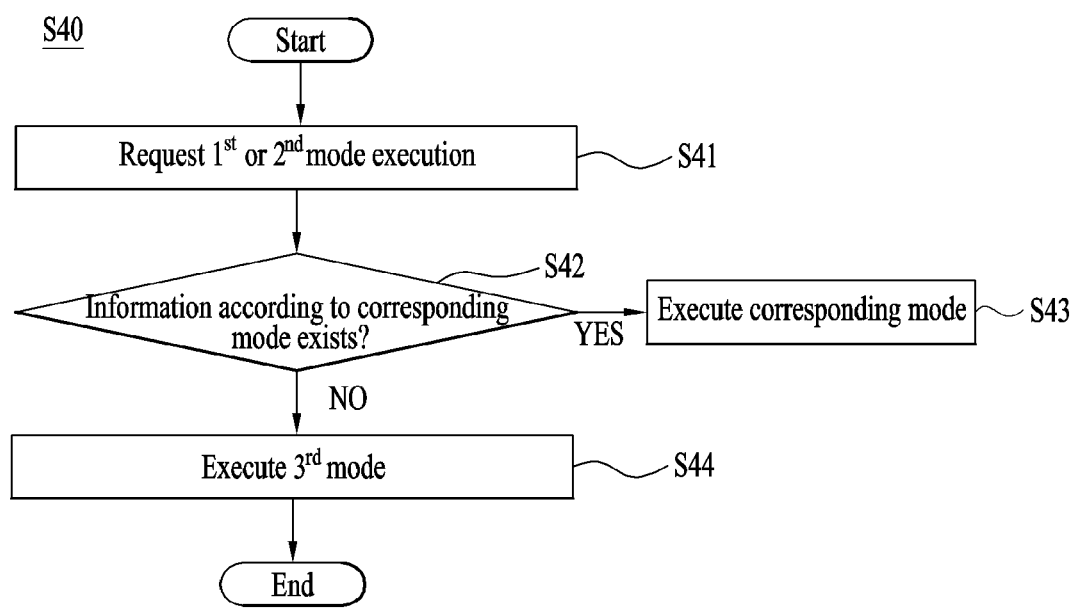
FIG. 8 is a flowchart to illustrate an operation of a display device in case of non-presence of information on a requested mode.

Meanwhile, although an execution of a specific mode is requested to the display device 100, the display device 100 may not have an information corresponding to the specific mode. In this instance, in order to provide a user with another appropriate information, the display device 100 needs to be switched from the specific mode to another mode. A controlling method S40 for such a switching is described in detail with reference to the related drawings as follows. FIG. 8 is a flowchart to illustrate an operation of a display device in case of non-presence of information on a requested mode. Such a controlling method is described in detail with reference to FIG. 8 together with FIGS. 11 to 14 as follows.

First of all, since the first mode M1 includes a most basic first information on a content to be provided, an execution of the first mode M1 may be requested to the display device 100 most preferentially. Hence, as shown in FIG. 8, the display device 100 may receive a request for the execution of the first mode M1 (S41). In the step S41, the display device 100 may receive the request for the execution of the first mode M1 according to the aforementioned manual mode execution S10 or the auto mode execution S20. Particularly, as mentioned in the foregoing description of the auto mode execution S20, when the power of the display device 100 is turned on, the display device 100 may be automatically requested to perform or execute the first mode M1. Moreover, the display device 100 may receive the request for the execution of the first mode M1 according to the aforementioned mode switching S30. Meanwhile, since the second mode M2 includes an information related to the content to be provided, i.e., a second information, a user may refer to the second information prior to a request for a third information, i.e., a full content. Hence, the display device 100 may receive a request for an execution of the second mode M2 instead of the execution of the first mode M1. Further, the execution of the second mode M2 may be requested according to one of the controlling methods S10, S20 and S30 mentioned in the foregoing description.

If the first mode M1 is requested, the display device 100 may detect whether an information corresponding to the requested mode, i.e., the first information exists (S42). In the detecting step S42, the display device 100 can check whether the first information exists from a currently received content or whether the first information has been already saved in a storage device of the display device 100. If the second mode M2 is requested, the display device 100 can detect whether the second information exists by the same method as mentioned in the foregoing description.

If the display device 100 has the first information, the display device 100 can perform the requested first mode M1 to provide the first information. If the second mode M2 is requested and the second information exists, the display device 100 can perform the second mode M2. Further, although the first information does not exist, the display device 100 is always able to provide a third information, i.e., a full content to be provided. Hence, if the display device 100 does not have the first information, the display device 100 can perform the third mode M3 directly to provide the third information (S44). If the second information does not exist in the display device 100 despite that the second mode M2 is requested, the third mode M3 can be directly performed by the display device 100 for the same reason. Further, if necessary, if the first information does not exist, the display device 100 may perform the second mode M2 instead of the third mode M3. Further, if the display device 100 does not have the third information but has the first information or the second information, which corresponds to a rare case, the display device 100 can perform or execute the first mode M1 or the second mode M2 to provide the user with the first information or the second information for reference.

Although an information according to a requested mode does not exist, the aforementioned mode switching S40 provides another appropriate mode and an information included in the provided mode so as to enable a smooth operation of the display device 100.

Figure 9:
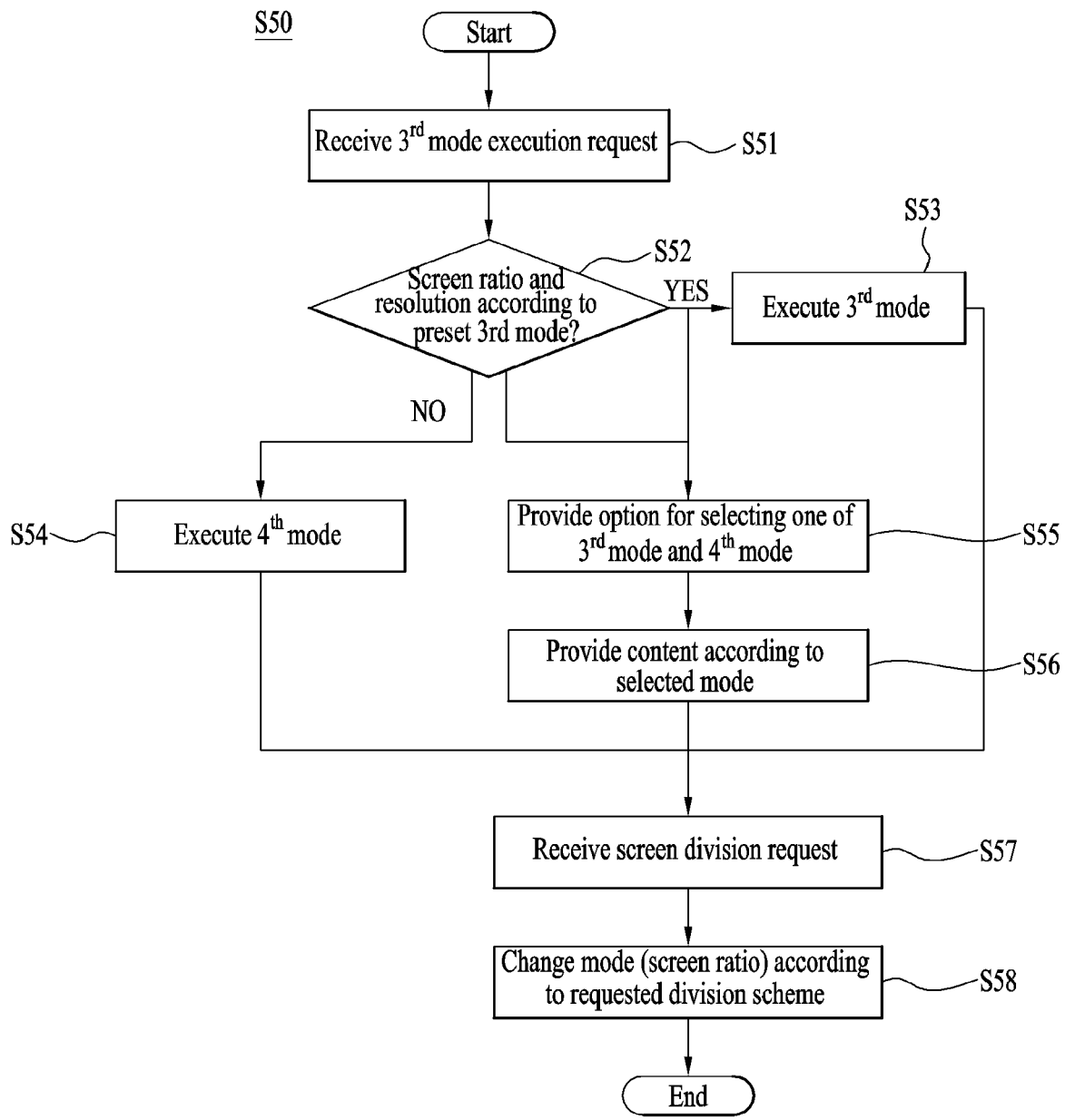
FIG. 9 is a flowchart to illustrate a detailed operation of a display device according to a third mode.
Figure 15:
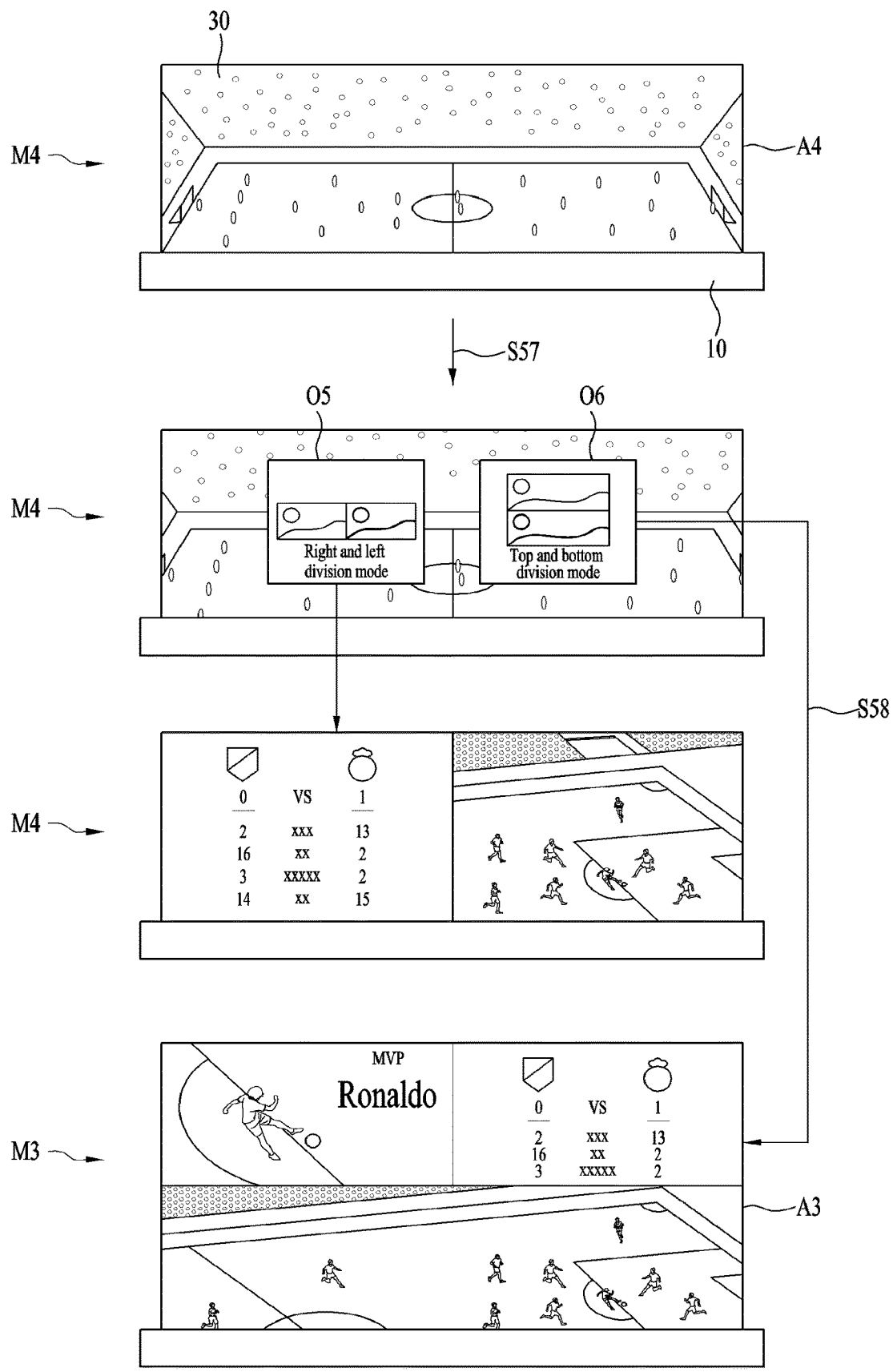
FIG. 15 is a schematic diagram to illustrate an operation when screen split is requested in a display device.

Further, when the display device 100 is requested to provide a full content, a content to be provided may not have a constant screen ratio or resolution. In particular, since a real resolution or screen ratio of the full content may be changed according to a property of the full content to be provided, it may be necessary for the display device 100 to perform a mode capable of providing screen sizes appropriate for various real resolutions or screen ratios. Hence, a controlling method S50 for such an optimal mode is described in detail with reference to the related drawings as follows. FIG. 9 is a flowchart to illustrate a detailed operation of a display device according to a third mode, and FIG. 15 is a schematic diagram to illustrate an operation when screen split is requested in a display device. Such a controlling method is described in detail with reference to FIG. 9 and FIG. 15 together with FIGS. 11 to 14 as follows.

Referring to FIG. 9, the display device 100 may be requested to perform (or execute) the third mode M3 to provide a full content, i.e., a third content (S51). In the step S51, the display device 100 may receive the request for the execution of the third mode M3 according to the aforementioned manual mode execution S10 or the aforementioned auto mode execution S20. And, the display device 100 may receive the request for the execution of the third mode M3 according to the aforementioned mode switching S30 or S40.

If the third mode M3 is requested, the display device 100 can detect whether a real screen ratio or resolution of the full content to be provided is appropriate for a preset third size A3 according to the third mode M3 (S52). In particular, the display device 100 can confirm whether the real screen ratio or resolution of the full content to be provided matches a screen ratio or resolution set according to the third mode M3. If the real screen ratio or resolution is appropriate for the preset third size A3, i.e., a preset screen ratio or resolution, the display device 100 can perform (or execute) the third mode M3 (S53). If the real screen ratio or resolution is not appropriate for the preset screen ratio or resolution, the display device 100 can perform (or execute) the fourth mode M4 (S54). Unlike the third mode M3 having the third size A3 fixed as mentioned in the foregoing description, the fourth mode M4 is configured to provide a fourth size A4 adjustable according to various resolutions and screen ratios, whereby a content having such a resolution or screen ratio can be smoothly provided. Hence, according to the performing step S53 or S54, if the display device 100 is requested to execute or perform the third mode M3, the display device 100 can automatically perform one of the third mode M3 and the fourth mode M4 to fit the real resolution or screen ratio of the content to be provided. FIG. 12 shows one example of the auto execution well. Referring to FIG. 12, if the content to be provided has a screen ratio of 16:9 corresponding to the third size A3, the display device 100 can perform the third mode M3 to form a screen according to the third size A3 (S53). Further, if the content to be provided has a screen ratio of 32:9 failing to correspond to the third size A3, the display device 100 can perform the fourth mode M4 to form the fourth size A4 appropriate for such a screen ratio (S54).

Further, after the detecting step S52, the display device 100 can provide a user with an option capable of selecting one of the third mode M3 and the fourth mode M4 instead of the performing step S53 or S54 (S55). In the providing step S55, the display device 100 can indicate which one of the third mode M3 and the fourth mode M4 is appropriate for the content to be provided in consideration of the real resolution or screen ratio obtained from the detecting step S52. Yet, in the providing step S55, the display device 100 can still provide the option capable of selecting one of the third mode M3 and the fourth mode M4 to the user instead of the auto execution according to the performing steps S53 and S54 (S55). Hence, the user can be provided with the content according to a mode desired by the user irrespective of the real suitability to the content to be provided (S56). One example of such a manual selection is well illustrated in FIG. 12, which is understandable without additional description.

As mentioned in the foregoing description, the optimal mode execution S50 automatically provides a mode appropriate for a real resolution or screen ratio of a full content to be provided or may allow a user to select a desired mode irrespective of such a resolution or screen ratio. Hence, the optimal mode execution S50 can provide a user with convenience and flexibility in using the device.

Meanwhile, after the third mode M3 or the fourth mode M4 has been performed according to the former steps S51 to S56, the user can be simultaneously provided with more contents by dividing a screen provided according to the performed mode. In order to provide a multitude of the contents, the display device 100 may be requested to divide the screen in a currently performed mode (S57). For instance, as shown in FIG. 15, the display device 100 may be requested to divide the screen into two screens (i.e., a right screen and a left screen, or a top screen and a bottom screen) (S57). Such a request can be made using the options O5 and O6 provided by the display device 100. For instance, as shown in FIG. 15, according to the fourth mode M4, a screen in the fourth size A4 corresponding to a screen ratio of 32:9 can be provided by the display device 100. If the screen at the screen ratio of 32:9 (i.e., the fourth size A4) is divided into the right screen and the left screen according to the option O5, each of the divided screens can have a screen ratio of 16:9 and can be appropriately disposed in the screen in the fourth size A4. Further, if the screen in the fourth size A4 is divided into the top screen and the bottom screen according to the option O6, the screen ratio of 32:9 in the fourth size A4 may be inappropriate for including both of the top screen and the bottom screen. Hence, in order to form a screen capable of appropriately disposing the top screen and the bottom screen, the display device 100 can perform another mode (S58). For instance, the display device 100 can perform the third mode M3. In this instance, the screen ratio of 16:9 corresponding to the third size A3 of the third mode M3 may be appropriate for displaying the two screens divided into the top and the bottom.

The aforementioned steps S57 and S58 can be performed at any time in the course of performing the third mode M3 or the fourth mode M4 irrespective of the steps S51 to S56. By the step S57 or S58, the screen can be conveniently divided in the course of performing or executing the third mode M3 or the fourth mode M4. And, the divided screens can be appropriately disposed.

Accordingly, the present application provides the following effects or features.

First of all, in the present application, a display device displays a quantity of a prescribed information and includes a multitude of different modes for forming a screen size appropriate for the information. As the display device operates according to such a mode, a desired information can be displayed in a screen size appropriate for the desired information, whereby a user can use the display device conveniently. Secondly, the display device controls executions of the modes optimally according to various controlling methods, whereby a user can use the display device more conveniently.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
a body;
a roller rotatably installed in the body;
a flexible display configured to be wound or unwound from the roller in response to a rotation of the roller; and
a controller configured to:
detect a type of a content to be displayed, and
change a screen size of the flexible display according to the detected type of the content by winding or unwinding of the flexible display,
wherein the controller is further configured to:
provide an option for selecting one of a plurality of modes for displaying different detected types or quantities of the content, and
expand the flexible display in a size appropriate for a preset type or quantity of the content in accordance with the selected mode,
wherein the controller is further configured to automatically execute one of the modes under a prescribed condition, and
wherein the condition comprises at least one of sensing that a preset time arrives, sensing that a user is present at home or approaches the display device, and sensing the user turns on a power of the display device.

2. The display device of claim 1, wherein the controller is further configured to:
activate the display device according to a first mode for displaying first information including a brief information regarding the content on the flexible display, and
expand the flexible display in a first size appropriate for displaying the first information from the body.

3. The display device of claim 2, wherein the controller is further configured to:
activate the display device according to a second mode for providing second information, the second information including more detailed information than the first information or the content itself, and
expand the flexible display in a second size appropriate for providing the second information from the body.

4. The display device of claim 3, wherein the controller is further configured to:
activate the display device according to a third mode for displaying third information corresponding to the content itself on the flexible display, and
expand the flexible display in a third size appropriate for displaying the third information from the body.

5. The display device of claim 4, wherein the controller is further configured to:
activate the display device according to a fourth mode for displaying fourth information corresponding to the content having a resolution and screen ratio different from those of the third information on the flexible display, and
expand the flexible display in a fourth size appropriate for displaying the fourth information from the body.

6. The display device of claim 1, wherein the content comprises a video content including a TV show or a sports broadcast, an audio content including music, and a supplementary content including a user customized information and a living information.

7. The display device of claim 2, wherein the first information comprises a reminder or notification for the content to be broadcasted or played and a summary of the content for providing a user with a prescribed information,
wherein the first size includes a screen ratio of 10:1~15:1, and
wherein the reminder or notification of the first information comprises a name of the content to be broadcasted or played, a broadcast and play scheduled time of the content, and a viewing or recording reservation of the content.

8. The display device of claim 3, wherein a height of the flexible display according to the second size is at least three times greater than that of the flexible display according to the first size.

9. The display device of claim 3, wherein the second information comprises a preview of the content to be broadcasted or played,
 wherein the second size comprises a screen ratio of 4:1~6:1, and
 wherein the preview of the second information comprises a table of contents and a synopsis.

10. The display device of claim 3, wherein the second information comprises an audio content played via the display device and a user interface configured to control a playback of the audio content.

11. The display device of claim 10, wherein the user interface of the second information includes a play list of the audio content or detailed information of the played audio content.

12. The display device of claim 5, wherein the third size comprises a screen ratio of 16:9,
 wherein the fourth size is greater than the third size, and
 wherein the fourth size comprises a screen ratio of 1.9:1~2.35:1.

13. The display device of claim 2, wherein the controller is further configured to automatically perform the first mode under a prescribed condition, and
 wherein the condition comprises at least one of sensing that a preset time arrives, sensing that a user is present at home or approaches the display device, and sensing the user turns on a power of the display device.

14. The display device of claim 2, wherein the controller is further configured to provide within the first information an option to enter into any one of other modes from the first mode.

15. The display device of claim 3, wherein the controller is further configured to provide within the second information an option to enter into the first mode and other modes from the second mode.

16. The display device of claim 5, wherein the controller is further configured to automatically execute either the third mode or the fourth mode to fit a real resolution and a real screen ratio of a provided content in response to a request to execute the third mode.

17. The display device of claim 5, wherein the controller is further configured to provide a user with an option for selecting either the third mode or the fourth mode in consideration of a real resolution and a real screen ratio of the provided content in response to a request to execute the third mode.

18. The display device claim 4, wherein when an execution of the first mode is requested, if the display device does not have the first information according to the first mode, the controller is further configured to activate the display device according to the third mode.

* * * * *